US012221289B2

(12) United States Patent
Nariai et al.

(10) Patent No.: US 12,221,289 B2
(45) Date of Patent: Feb. 11, 2025

(54) DRIVER AND CARRIER

(71) Applicant: KAWASAKI JUKOGYO KABUSHIKI KAISHA, Kobe (JP)

(72) Inventors: Hitoshi Nariai, Kobe (JP); Kengo Maeda, Kobe (JP); Shogo Fujita, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 108 days.

(21) Appl. No.: 18/029,396

(22) PCT Filed: Oct. 1, 2021

(86) PCT No.: PCT/JP2021/036469
§ 371 (c)(1),
(2) Date: Mar. 30, 2023

(87) PCT Pub. No.: WO2022/071592
PCT Pub. Date: Apr. 7, 2022

(65) Prior Publication Data
US 2023/0365340 A1 Nov. 16, 2023

(30) Foreign Application Priority Data
Oct. 2, 2020 (JP) ................................. 2020-168004

(51) Int. Cl.
*B65G 43/00* (2006.01)
*B65G 47/90* (2006.01)
*H02K 11/21* (2016.01)
*H02K 11/27* (2016.01)

(52) U.S. Cl.
CPC ............. *B65G 43/00* (2013.01); *B65G 47/90* (2013.01); *H02K 11/21* (2016.01); *H02K 11/27* (2016.01); *B65G 2812/02089* (2013.01)

(58) Field of Classification Search
None
See application file for complete search history.

(56) References Cited

U.S. PATENT DOCUMENTS

| 6,384,561 B1 | 5/2002 | Niizuma et al. |
| 10,978,969 B2 * | 4/2021 | Weber .................... B60L 13/10 |
| 11,245,348 B2 * | 2/2022 | Flixeder ............... G01R 31/343 |

(Continued)

FOREIGN PATENT DOCUMENTS

| JP | 56083285 A | * 7/1981 |
| JP | S56-083285 A | 7/1981 |
| JP | 09086638 A | * 3/1997 |

(Continued)

*Primary Examiner* — Kavel Singh
(74) *Attorney, Agent, or Firm* — Oliff PLC

(57) ABSTRACT

A driver includes: a first motor located so as to rotate a driving shaft; a second motor located so as to rotate the driving shaft; and circuitry. The circuitry performs control while switching between a dual mode and a single mode. In the dual mode, the circuitry drives the first motor and the second motor together. In the single mode, the circuitry drives a drive target motor that is one of the first motor and the second motor and performs such control as to set one or more among a rotational speed, rotation acceleration, and rotation deceleration of the drive target motor to be lower than that or those in the dual mode.

5 Claims, 18 Drawing Sheets

(56) References Cited

U.S. PATENT DOCUMENTS

2007/0159125 A1* 7/2007 Aoyama .............. G05B 19/414
                                                          318/569
2009/0102409 A1   4/2009 Okita et al.

FOREIGN PATENT DOCUMENTS

| JP | H09-86638 A | | 3/1997 | | |
|---|---|---|---|---|---|
| JP | 2001202102 A | * | 7/2001 | ........... | B30B 15/148 |
| JP | 2006-042483 A | | 2/2006 | | |
| JP | 2009-106034 A | | 5/2009 | | |
| JP | 2013-81282 A | | 5/2013 | | |
| JP | 2013081282 A | * | 5/2013 | | |
| JP | 6343666 B2 | | 6/2018 | | |
| WO | 2015/004033 A1 | | 1/2015 | | |

* cited by examiner

DRIVER AND CARRIER

CROSS-REFERENCE TO RELATED APPLICATION

This application claims priority to and the benefit of Japanese Patent Application No. 2020-168004 filed on Oct. 2, 2020, the entire disclosure of which is incorporated herein by reference.

TECHNICAL FIELD

The present disclosure relates to a driver and a carrier.

BACKGROUND ART

For example, a carrier that is used in a production line of a factory and conveys workpieces continuously operates without stopping. If the carrier stops for some reason, the entire production line may be influenced. For example, PTL 1 discloses a laboratory automation system including a double motor traction device for conveyor belts. The traction device includes two motors that operate a conveyor belt. During a normal operation of the traction device, a central control unit of the system operates only a first motor. When the first motor malfunctions or when the life of the first motor is about to end, the central control unit of the system stops the first motor and starts a second motor.

CITATION LIST

Patent Literature

PTL 1: Japanese Patent No. 6,343,666

SUMMARY OF INVENTION

As in PTL 1, including a motor that does not operate during a normal operation in a device is inefficient in terms of space efficiency and cost. For example, to avoid an increase in size of a motor beyond a standard, one driving shaft of a device is driven by two motors at the same time in some cases. For example, if an abnormality occurs in one of the motors, the output of the motors may become insufficient, and therefore, the operation of the device may not be continued.

An object of the present disclosure is to provide a driver and a carrier, each of which can continuously drive a driving shaft even when an abnormality occurs in at least one of two motors that drive the driving shaft at the same time.

A driver according to one aspect of the present disclosure includes: a driving shaft that is rotatable; a first motor located so as to rotate the driving shaft; a second motor located so as to rotate the driving shaft; and a drive controller that controls driving of the first motor and driving of the second motor. The drive controller performs control while switching between a dual mode and a single mode. In the dual mode, the drive controller drives the first motor and the second motor together. In the single mode, the drive controller drives a drive target motor that is one of the first motor and the second motor and performs such control as to set one or more among a rotational speed, rotation acceleration, and rotation deceleration of the drive target motor to be lower than that or those in the dual mode.

DESCRIPTION OF EMBODIMENTS

Embodiment

Hereinafter, an exemplary embodiment of the present disclosure will be described with reference to the drawings. The exemplary embodiment described below is a comprehensive or specific example. Among components in the following exemplary embodiment, components that are not recited in independent claims which embody the broadest concept of the present disclosure will be described as optional components. The diagrams in the accompanying drawings are schematic diagrams and are not necessarily strictly drawn. In the diagrams, the same reference signs are used for the substantially identical components, and the repetition of the same explanation may be avoided, or such explanation may be simplified. Moreover, in the present description and the claims, a "device" may denote not only a single device but also a system including devices.

Configuration of Robot System

Figure 1:
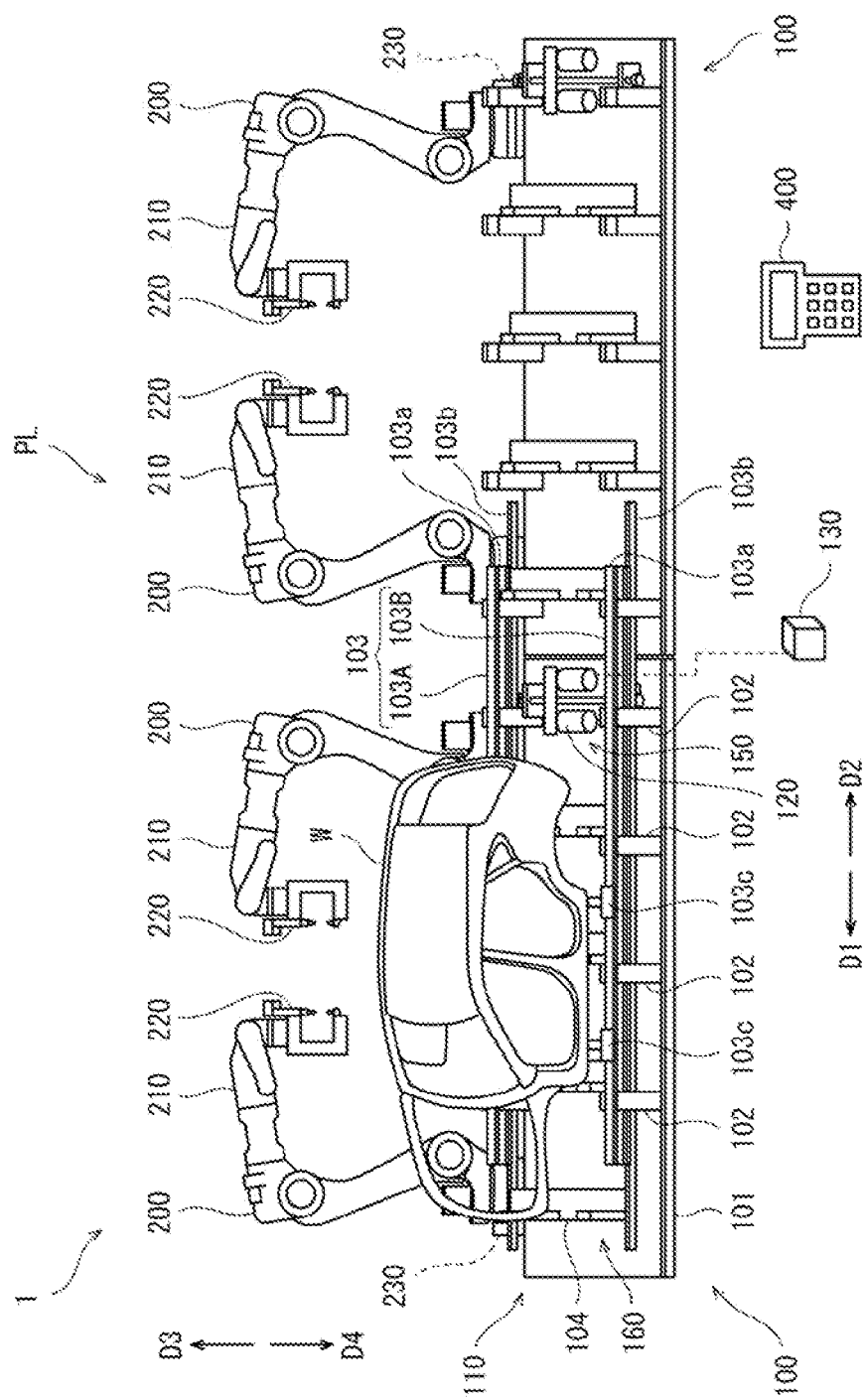
FIG. 1 is a schematic diagram showing one example of the configuration of a robot system according to an exemplary embodiment.

The configuration of a robot system 1 according to the exemplary embodiment will be described. FIG. 1 is a schematic diagram showing one example of the configuration of the robot system 1 according to the exemplary embodiment. As shown in FIG. 1, the robot system 1 includes at least one carrier 100, at least one robot 200, an integration controller 300 shown in FIG. 3, and an input-output device 400. In the present embodiment, the robot system 1 is located at a production line PL. However, the present embodiment is not limited to this.

In FIG. 1, two carriers 100 are shown. However, in the production line PL, a plurality of carriers 100 are located adjacent to each other in a conveyance direction D1. For example, with respect to the two carriers 100 shown in FIG. 1, the other carriers 100 are located in the direction D1 and its opposite direction D2. At least one robot 200 is located around each carrier 100. In FIG. 1, two robots 200 are located at only one side of each carrier 100 with respect to the direction D1. However, two or more robots 200 may be located at both sides of each carrier 100. The carrier 100 carries a workpiece W to the adjacent carrier 100 in the direction D1. Each robot 200 performs work with respect to the workpiece W located on the carrier 100. In the present embodiment, the workpiece W is a vehicle body of an automobile, and the work performed with respect to the workpiece W is spot welding. The workpiece W may be an object other than the vehicle body of the automobile, and the work may be work other than the spot welding.

Configuration of Robot

As shown in FIG. 1, each robot 200 includes a robotic arm 210, an end effector 220, and a robot controller 230. The robotic arm 210 includes at least one joint and has at least one degree of freedom. The end effector 220 can apply an action to the workpiece W. In the present embodiment, the end effector 220 is a spot welding gun. A tip of the robotic arm 210 has a structure where the end effector 220 can be attached thereto. The robotic arm 210 can freely change the position and posture of the end effector 220. In the present embodiment, the type of the robotic arm 210 is a vertical articulated type. However, the present embodiment is not limited to this. The type of the robotic arm 210 may be any type, and may be, for example, a horizontal articulated type, a polar coordinate type, a cylindrical coordinate type, a rectangular coordinate type, or the like.

The robot controller 230 controls all the operations of the robot 200 including the operation of the robotic arm 210 and the operation of the end effector 220. The robot controller 230 includes a computer that generates commands to the robotic arm 210 and the end effector 220 and may further include electric circuitry that controls electric power supplied to the robotic arm 210 and the end effector 220. The robot controller 230 is connected to the robotic arm 210 and the end effector 220 through wired communication, wireless communication, or a combination thereof. Communication thereamong may be any type of wired communication or any type of wireless communication.

Configuration of Carrier

As shown in FIG. 1, the carrier 100 carries rails 103 that support the workpiece W. The carrier 100 includes a main body 110, a drive structure 120, and a drive controller 130. The drive structure 120 and the drive controller 130 are included in a driver 150. The main body 110 includes a base 101, rail guides 102, the rails 103, and lifters 104. The rail guides 102, the rails 103, and the lifters 104 are included in a moving structure 160 that moves the workpiece W.

In the vicinity of each of both edges of the base 101 with respect to the direction D1 that is a longitudinal direction of the base 101, the rail guides 102 are arranged on the base 101, having a rectangular plate shape, in a row so as to be spaced part from each other in the direction D1. Each of the rail guides 102 extends in an upper-lower direction. In the present embodiment, the rail guides 102 at one of the edges of the base 101 and the rail guides 102 at the other edge of the base 101 are arranged symmetrically about an axis extending in the direction D1. However, the present embodiment is not limited to this.

In the present description and the claims, each of an "upper direction DY", a "lower direction D4", and an "upper and lower directions D3 and D4" is a direction perpendicular to a supporting surface on which the base 101 is placed. Moreover, the "upper direction D3" is a direction away from the supporting surface, and the "lower direction D4" is a direction toward the supporting surface. In the present embodiment, the supporting surface is a substantially horizontal surface.

The carrier 100 includes two rails 103 that are used to carry one workpiece W. In the following description, when distinguishing these two rails 103, the rails 103 may be described as "rails 103A and 103B". When not distinguishing these two rails 103, the rails 103 may be described as the "rails 103". Each of the rails 103A and 103B includes a rail main body 103a, a first drive member 103b, and at least one support piece 103c.

The rail guides 102 at one of the edges of the base 101 engage with the rail main body 103a of the rail 103A and support the rail main body 103a of the rail 103A such that the rail main body 103a of the rail 103A is slidable in the direction D1. The rail guides 102 at the other edge of the base 101 engage with the rail main body 103a of the rail 103B and support the rail main body 103a of the rail 103B such that the rail main body 103a of the rail 103B is slidable in the direction D1. The rail main bodies 103a of the rails 103A and 103B extend in the direction D1 in parallel. The rail main bodies 103a of the rails 103A and 103B support the workpiece W through the support pieces 103c located on the rail main bodies 103a. For example, two support pieces 103c are located at such positions as to support predetermined portions of the workpiece W.

Each of the rails 103A and 103B includes the first drive member 103b located at a lower portion of the rail main body 103a. The first drive member 103b is fixed to the rail main body 103a. As with the rail main body 103a, the first drive member 103b is a columnar member extending in the direction D1. The first drive member 103b projects in the directions D1 and D2 beyond the rail main body 103a. The first drive member 103b includes a gear tooth at a lower portion thereof as an engaging portion for the driving of the rail main body 103a and is formed as a rack.

The lifters 104 are located between the rail guides 102 at both edges of the base 101 so as to be spaced apart from each other in the direction D1. Each of the lifters 104 can extend and retract in the upper and lower directions D3 and D4. The lifter 104 contacts the workpiece W from a lower side and extends or retracts to move the workpiece W upward or downward. For example, the lifter 104 includes an electric actuator that drives an extending-retracting operation of the lifter 104.

Figure 2:
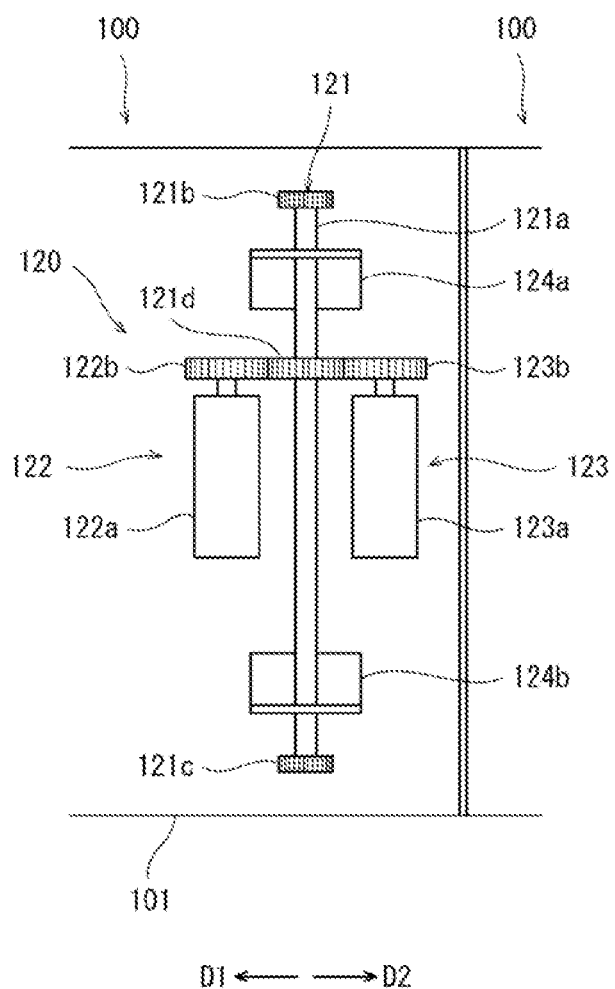
FIG. 2 is a plan view showing one example of the configuration of a drive structure of a carrier according to the embodiment.

FIG. 2 is a plan view showing one example of the configuration of the drive structure 120 of the carrier 100 according to the embodiment. As shown in FIGS. 1 and 2, the drive structure 120 includes a second drive member 121, a first drive 122, and a second drive 123.

The second drive member 121 is a columnar member and is one example of a rotatable driving shaft. The second drive member 121 includes a shaft 121a extending in a direction intersecting with the direction D1 on the base 101, specifically a direction perpendicular to the direction D1. The shaft 121a is supported so as to be rotatable about a center axis thereof by two bearing members 124a and 124b located on the base 101. The second drive member 121 further includes cylindrical gears 121b, 121c, and 121d. The cylindrical gears 121b and 121c are fixed to both ends of the shaft 121a so as to rotate integrally therewith about the center axis of the shaft 121a. The cylindrical gear 121d is fixed to the shaft 121a at a position between the cylindrical gears 121b and 121c so as to rotate integrally therewith about the center axis of the shaft 121a. The cylindrical gears 121b and 121c respectively engage with the first drive members 103b of the rails 103A and 103B and are formed as pinions. The first drive member 103b and the second drive member 121 have a rack-and-pinion structure.

The drives 122 and 123 are located at both sides of the shaft 121a in the directions D1 and D2. The drive 122 includes a servomotor 122a and a cylindrical gear 122b located at a rotating shaft of the servomotor 122a. The drive 123 includes a servomotor 123a and a cylindrical gear 123b located at a rotating shaft of the servomotor 123a. The cylindrical gear 122b is fixed to the rotating shaft of the servomotor 122a so as to rotate integrally therewith about a center axis of the rotating shaft. The cylindrical gear 123b is fixed to the rotating shaft of the servomotor 123a so as to rotate integrally therewith about a center axis of the rotating shaft. The cylindrical gears 122b and 123b gear-engage with the cylindrical gear 121d. The first servomotor 122a is one example of a first motor, and the second servomotor 123a is one example of a second motor.

In the present embodiment, the servomotors 122a and 123a are the same in configuration as each other. However, the present embodiment is not limited to this. Each of the servomotors 122a and 123a includes an electric motor and a rotation sensor, such as an encoder, which detects the rotational frequency of the electric motor. For example, the configurations and abilities, such as rated output and characteristics, of the electric motors of the servomotors 122a and 123a are the same as each other. Each of the servomotors 122a and 123a sends a detection signal of the rotation sensor to the drive controller 130.

The drive controller 130 controls the operations of the servomotors 122a and 123a. The drive controller 130 includes a computer that generates commands to the servomotors 122a and 123a and may further include electric circuitry that controls electric power supplied to the servomotors 122a and 123a. The drive controller 130 is connected to the servomotors 122a and 123a through wired communication, wireless communication, or a combination thereof. Communication thereamong may be any type of wired communication or any type of wireless communication.

By the control of the drive controller 130, the servomotors 122a and 123a rotate in the same rotational direction that is one direction or its opposite direction. The servomotors 122a and 123a that rotate as above cooperatively rotate the cylindrical gear 121d and the shaft 121a through the cylindrical gears 122b and 123b in one direction or its opposite direction. The shaft 121a moves the first drive members 103b of the rails 103A and 103B in the direction D1 or D2 through the cylindrical gears 121b and 121c. Therefore, the rails 103A and 103B move in the direction D1 or D2 together with the workpiece W, mounted on the rails 103A and 103B, to carry the workpiece W.

In the present embodiment, the first drive member 103b is longer than the base 101 in the direction D1. Therefore, when the drive structure 120 moves the rails 103A and 103B in the direction D1, end portions of the first drive members 103b of the rails 103A and 103B in the direction D1 can engage with the cylindrical gears 121b and 121c of the drive structure 120 of the adjacent carrier 100 that is adjacent to the carrier 100 in the direction D1. At this time, end portions of the first drive members 103b in the direction D2 are in engagement with the cylindrical gears 121b and 121c of the drive structure 120 that is moving the first drive members 103b. Therefore, the rails 103A and 103B can be moved between the carriers 100.

Configuration of Input-Output Device

As shown in FIG. 1, for example, the input-output device 400 receives input, such as a command, information, and data, from a user and performs output to the integration controller 300. For example, the input-output device 400 receives information and data from the integration controller 300 and presents the information and the data to the user. The input-output device 400 includes an inputter and a presenter, such as a display. The inputter may be any known inputter. The presenter may be any device that supplies information that is perceptible by the user through, for example, the sense of sight and the sense of hearing. For example, the input-output device 400 may be: a teaching device that can generate teaching data for teaching predetermined operations of the carrier 100 and the robot 200; a personal computer; a smart device, such as a smartphone, a smart watch, or a tablet terminal; another terminal device; or a line controller. The line controller may also be called a "process control panel" or a "line control panel".

Hardware Configuration of Robot System

Figure 3:
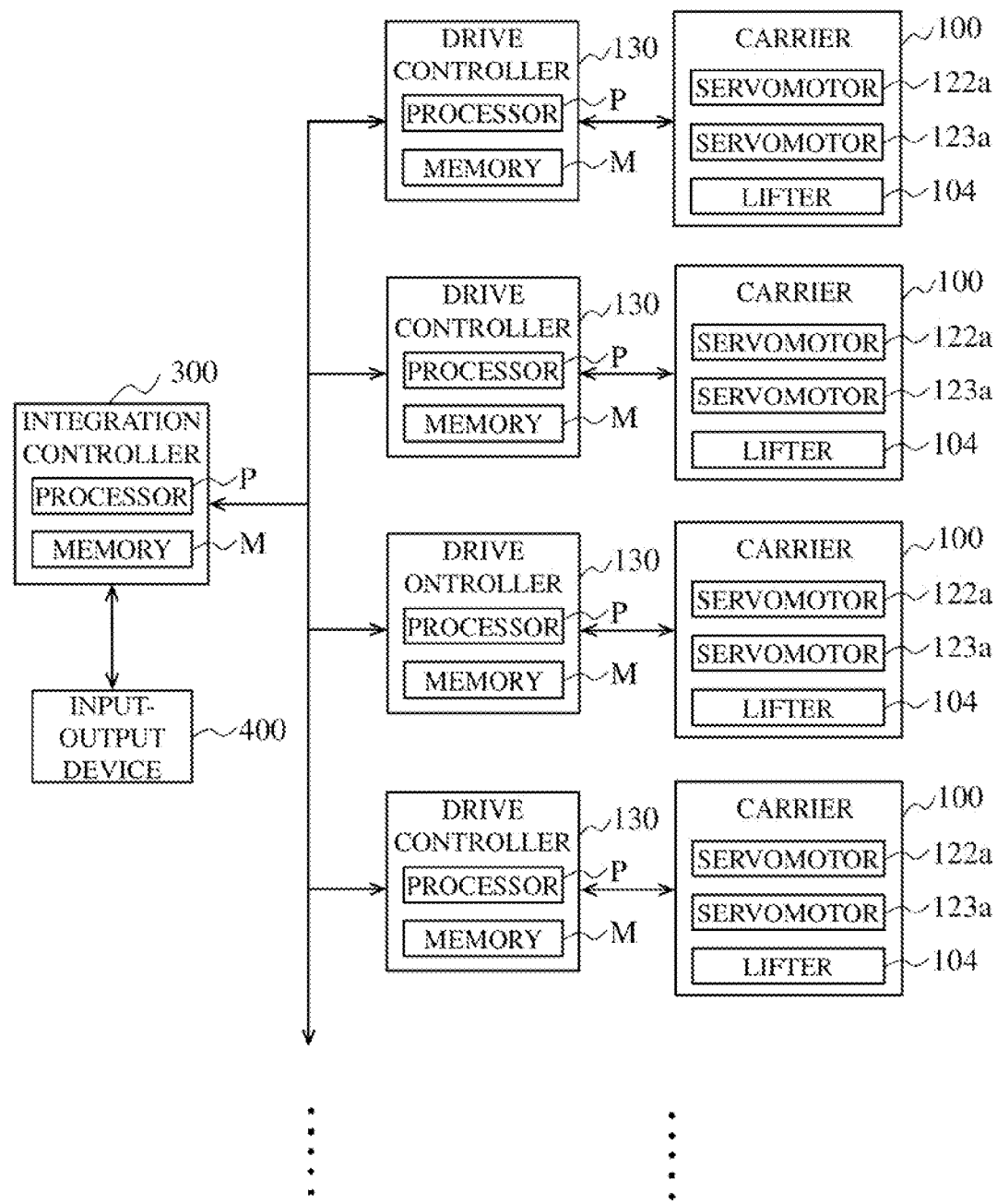
FIG. 3 is a block diagram showing one example of a hardware configuration of the robot system according to the embodiment.

The hardware configuration of the robot system 1 will be described. FIG. 3 is a block diagram showing one example of the hardware configuration of the robot system 1 according to the embodiment. As shown in FIG. 3, the integration controller 300 controls the operations of all the carriers 100. The integration controller 300 can control the carriers 100 such that the carriers 100 operate in association with each other. The integration controller 300 receives a command, information, data, and the like, which have been input to the input-output device 400, from the input-output device 400 and performs control in accordance with the command, the information, the data, and the like. The integration controller 300 outputs various information, data, and the like of the robot system 1 to the input-output device 400.

The integration controller 300 is connected to the drive controllers 130 of the carriers 100 and the input-output device 400 through wired communication, wireless communication, or a combination thereof. Communication thereamong may be any type of wired communication or any type of wireless communication. The integration controller 300 controls the drive controllers 130 such that the drive controllers 130 operate in association with each other. For example, the integration controller 300 can control the driving of the driving shafts in sync with each other. The driving shafts include the second drive members 121 respectively drive-controlled by the drive controllers 130. For example, the integration controller 300 may transmit or receive signals to or from the robot controller 230 through I/O communication, etc., and control the operations of the drive controllers 130 based on the signals. The integration controller 300 includes a computer.

For example, each of the computers of the integration controller 300 and the drive controllers 130 includes a processor P and a memory M. The computer may further include a storage that stores various data. The storage may include a memory apparatus, such as a hard disc drive or a SSD (Solid State Drive). The processor P and the memory M are included in processing circuitry or circuitry. Processing circuitry or circuitry transmits or receives commands, information, data, and the like to or from other devices. Processing circuitry or circuitry receives signals from various devices and outputs control signals to control targets. Circuitry may include processing circuitry.

The memory M stores a program executed by the processor P, various data, and the like. The memory M may include a memory apparatus that is, for example, a semiconductor memory, such as a volatile memory or a non-volatile memory. In the present embodiment, the memory M includes a RAM (Random Access Memory) as the volatile memory and a ROM (Read-Only Memory) as the non-volatile memory. However, the present embodiment is not limited to this.

The processor P makes a computer system together with the RAM and the ROM. The computer system may realize the functions of the computer in such a manner that the processor P uses the RAM as a work area and executes the program stored in the ROM. Some or all of the functions of the computer may be realized by the computer system, may be realized by dedicated hardware circuitry, such as electronic circuitry or integrated circuitry, or may be realized by the combination of the computer system and the hardware circuitry. The computer may be a single computer that executes processing by centralized control or may include plural computers that cooperate to execute processing by distributed control.

For example, the processor P may include a CPU (Central Processing Unit), a MPU (Micro Processing Unit), a GPU (Graphics Processing Unit), a microprocessor, a processor core, a multiprocessor, an ASIC (Application-Specific Integrated Circuit), a FPGA (Field Programmable Gate Array), or the like and may realize processing by a logic circuit or a dedicated circuit formed in an IC (integrated circuit) chip, a LSI (Large Scale Integration), or the like. However, the present embodiment is not limited to this. Plural processing may be realized by one or more integrated circuits or may be realized by only an integrated circuit.

The integration controller 300 may be configured to include at least some of the functions of the drive controller 130 and may be configured to include at least some of the functions of the robot controller 230.

Functional Configuration of Drive Controller

Figure 4:
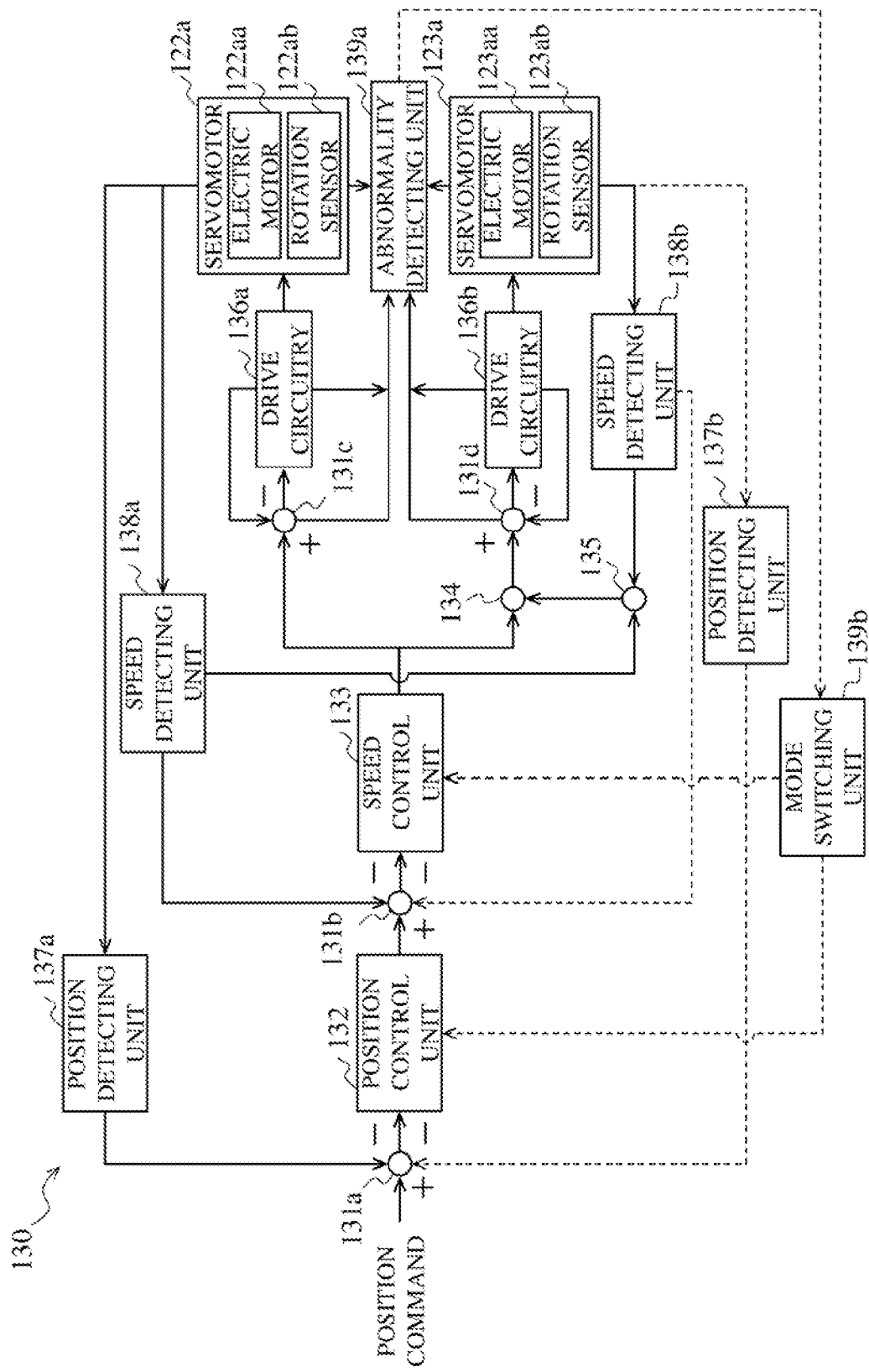
FIG. 4 is a block diagram showing one example of a functional configuration of a drive controller according to the embodiment.

The functional configuration of the drive controller 130 regarding the control of the servomotors 122*a* and 123*a* will be described. FIG. 4 is a block diagram showing one example of the functional configuration of the drive controller 130 according to the embodiment. As shown in FIG. 4, the drive controller 130 servo-controls the driving of the first servomotor 122*a* and the second servomotor 123*a* by using, as feedback information, information that includes one or more among the rotational positions, the rotational speeds, and the applied current values of the first servomotor 122*a* and the second servomotor 123*a*.

When both of the servomotors 122*a* and 123*a* are normal, the drive controller 130 operates in a dual mode and drives both of the servomotors 122*a* and 123*a*. The drive controller 130 controls the first servomotor 122*a* as a master motor and performs position control of controlling the rotational position and rotational speed of a first electric motor 122*aa* of the first servomotor 122*a*. This position control is one example of first control.

The drive controller 130 controls the second servomotor 123*a* as a slave motor and performs speed control of controlling the rotational speed of a second electric motor 123*aa* of the second servomotor 123*a* such that the rotational speed of the second electric motor 123*aa* of the second servomotor 123*a* synchronizes with the rotational speed of the first electric motor 122*aa*. This speed control is one example of second control. In the present description and the claims, the position control includes the control of at least the rotational position of the electric motor out of the rotational position of the electric motor and the rotational speed of the electric motor. In the present embodiment, the position control includes both the control of the rotational position and the control of the rotational speed.

When one of the servomotors 122*a* and 123*a* is abnormal, the drive controller 130 operates in a single mode. The drive controller 130 controls the normal servomotor out of the servomotors 122*a* and 123*a* as the master motor and stops the abnormal servomotor. To be specific, the drive controller 130 performs the position control of the normal servomotor 122*a* or 123*a*.

As functional components, the drive controller 130 includes subtracting units 131*a*, 131*b*, 131*c*, and 131*d*, a position control unit 132, a speed control unit 133, a current control unit 134, a difference detecting unit 135, drive circuitry 136*a* and drive circuitry 136*b*, position detecting unit 137*a* and 137*b*, speed detecting units 138*a* and 138*b*, an abnormality detecting unit 139*a*, and a mode switching unit 139*b*. Solid-line arrows connecting the components show the flow of the control in the dual mode. The flow of the control between the components shown by broken-line arrows is used in the single mode. The drive circuitry 136*a* and the drive circuitry 136*b* may be separate components from the drive controller 130.

The position detecting unit 137*a* functions when the first servomotor 122*a* is the master motor. The position detecting unit 137*a* receives detection signals from a first rotation sensor 122*ab* of the first servomotor 122*a* and processes the detection signals to detect the rotational position of the first electric motor 122*aa*. The position detecting unit 137*a* sends information of this rotational position to the subtracting unit 131*a*.

The position detector 137*b* functions when the second servomotor 123*a* is the master motor. The position detector 137*b* receives detection signals from a second rotation sensor 123*ab* of the second servomotor 123*a* and processes the detection signals to detect the rotational position of the second electric motor 123*aa*. The position detecting unit 137*a* sends information of this rotational position to the subtracting unit 131*a*.

The speed detecting unit 138*a* functions when the first servomotor 122*a* is the master motor. The speed detecting unit 138*a* receives detection signals from the first rotation sensor 122*ab* and processes the detection signals to detect the rotational speed of the first electric motor 122*aa*. In the dual mode, the speed detecting unit 138*a* sends information of this rotational speed to the subtracting unit 131*b* and the difference detecting unit 135. In the single mode, the speed detecting unit 138a sends the information of the rotational speed to the subtracting unit 131b.

The speed detecting unit 138b functions when in the dual mode and when the second servomotor 123a is the master motor in the single mode. The speed detecting unit 138b receives detection signals from the second rotation sensor 123ab and processes the detection signals to detect the rotational speed of the second electric motor 123aa. In the dual mode, the speed detecting unit 138b sends information of this rotational speed to the difference detecting unit 135. In the single mode, the speed detecting unit 138b sends the information of the rotational speed to the subtracting unit 131b.

The subtracting unit 131a receives a position command indicating a target conveyance position from the integration controller 300. The target conveyance position is a target position of the movement of the rails 103A and 103B. For example, the subtracting unit 131a receives the position command for every predetermined time step.

When the first servomotor 122a is the master motor, the subtracting unit 131a generates an angular deviation of a rotation angle of the first electric motor 122aa by subtracting a present rotational position of the first electric motor 122aa, which is received from the position detecting unit 137a, from a target rotational position of the first electric motor 122aa at the target conveyance position.

When the second servomotor 123a is the master motor, the subtracting unit 131a generates an angular deviation of a rotation angle of the second electric motor 123aa by subtracting a present rotational position of the second electric motor 123aa, which is received from the position detector 137b, from a target rotational position of the second electric motor 123aa at the target conveyance position.

The subtracting unit 131a generates the angular deviation by using, as feedback information, information of the present rotational position of the electric motor 122aa or 123aa and sends information of this angular deviation to the position control unit 132.

The position control unit 132 performs calculation processing by using the information of the angular deviation which is received from the subtracting unit 131a and the information of the predetermined time step which is the timing of the position command. As a result of the calculation processing, the position control unit 132 generates a speed command value indicating a target rotational speed of the electric motor of the servomotor and sends this speed command value to the subtracting unit 131b. When the first servomotor 122a is the master motor, the position control unit 132 generates the speed command value of the first electric motor 122aa. When the second servomotor 123a is the master motor, the position control unit 132 generates the speed command value of the second electric motor 123aa.

When the first servomotor 122a is the master motor, the subtracting unit 131b generates a speed deviation of the first electric motor 122aa by subtracting a present rotational speed of the first electric motor 122aa, which is received from the speed detecting unit 138a, from the speed command value of the first electric motor 122aa which is received from the position control unit 132.

When the second servomotor 123a is the master motor, the subtracting unit 131b generates a speed deviation of the second electric motor 123aa by subtracting a present rotational speed of the second electric motor 123aa, which is received from the speed detecting unit 138b, from the speed command value of the second electric motor 123aa which is received from the position control unit 132.

The subtracting unit 131b generates the speed deviation by using, as feedback information, information of the present rotational speed of the electric motor 122aa or 123aa and sends information of this speed deviation to the speed control unit 133.

The speed control unit 133 performs calculation processing by using the information of the speed deviation which is received from the subtracting unit 131b, to generate a current command value of the electric motor of the servomotor. The current command value may include a target current value of the electric motor, a target current frequency of the electric motor, and the like. The target current value of the electric motor corresponds to a target rotational torque of the electric motor, and the target current frequency of the electric motor corresponds to the target rotational speed of the electric motor. When the first servomotor 122a is the master motor, the speed control unit 133 generates the current command value by using the speed deviation of the first electric motor 122aa. When the second servomotor 123a is the master motor, the speed control unit 133 generates the current command value by using the speed deviation of the second electric motor 123aa.

In the dual mode, the speed control unit 133 sends the current command values to the subtracting unit 131c and the current control unit 134. In the present embodiment, since the configurations and abilities of the electric motors 122aa and 123aa are the same as each other, the current command value sent to the subtracting unit 131c and the current command value sent to the current control unit 134 are the same as each other. For example, when the configurations of the electric motors 122aa and 123aa, the abilities of the electric motors 122aa and 123aa, or both the configurations and abilities of the electric motors 122aa and 123aa are different from each other, the speed control unit 133 may generate the current command value corresponding to the electric motor 122aa and the current command value corresponding to the electric motor 123aa based on the speed deviation and send the current command values to the subtracting unit 131c and the current control unit 134. When the first servomotor 122a is the master motor in the single mode, the speed control unit 133 sends the current command value to only the subtracting unit 131c. When the second servomotor 123a is the master motor in the single mode, the speed control unit 133 sends the current command value to only the subtracting unit 131d through the current control unit 134.

The difference detecting unit 135 functions only in the dual mode. The difference detecting unit 135 uses information of the present rotational speed of the first electric motor 122aa which is received from the speed detecting unit 138a and information of the present rotational speed of the second electric motor 123aa which is received from the speed detecting unit 138b, to detect a difference between these two rotational speeds, and sends information of this difference to the current control unit 134.

The current control unit 134 functions in the dual mode. The current control unit 134 corrects the current command value, which is received from the speed control unit 133, by using the information of the difference which is received from the difference detecting unit 135. To be specific, the current control unit 134 performs processing of compensating the difference of the rotational speed. Specifically, the current control unit 134 corrects the target current value, the target current frequency, and the like included in the current command value such that the rotational speed of the second electric motor 123aa coincides with the rotational speed of the first electric motor 122aa, to generate a corrected current command value including the corrected target current value, the corrected target current frequency, and the like. The current control unit 134 sends the corrected current command value to the subtracting unit 131*d*.

The current control unit 134 functions also when the second servomotor 123*a* is the master motor in the single mode. The current control unit 134 sends the current command value, which is received from the speed control unit 133, as the corrected current command value to the subtracting unit 131*d*.

The subtracting unit 131*c* receives from the drive circuitry 136*a* an output value of the current output from the drive circuitry 136*a* to the first servomotor 122*a*. A current sensor may be located between the drive circuitry 136*a* and the first servomotor 122*a*, and the subtracting unit 131*c* may receive the output value of the current detected by the current sensor. The output value of the current may include an output current value, an output current frequency, and the like. The subtracting unit 131*c* generates a current deviation by subtracting the output value of a present current, which is output to the first servomotor 122*a*, from the current command value which is received from the speed control unit 133. The subtracting unit 131*c* generates the current deviation by using, as feedback information, information of the output value of the present current which is output to the first servomotor 122*a*, and sends this current deviation to the drive circuitry 136*a*.

The subtracting unit 131*d* receives from the drive circuitry 136*b* an output value of the current output from the drive circuitry 136*b* to the second servomotor 123*a*. A current sensor may be located between the drive circuitry 136*b* and the second servomotor 123*a*, and the subtracting unit 131*d* may receive the output value of the current detected by the current sensor. The subtracting unit 131*d* generates a current deviation by subtracting the output value of a present current, which is output to the second servomotor 123*a*, from the corrected current command value which is received from the current control unit 134. The subtracting unit 131*d* generates the current deviation by using, as feedback information, information of the output value of the present current which is output to the second servomotor 123*a*, and sends this current deviation to the drive circuitry 136*b*.

The drive circuitry 136*a* applies a current to the first electric motor 122*aa*, and the drive circuitry 136*b* applies a current to the second electric motor 123*aa*. For example, each of the drive circuitry 136*a* and the drive circuitry 136*b* may include a converter, an inverter, an amplifier, and the like. The drive circuitry 136*a* controls the current applied to the first electric motor 122*aa* so as to change the current value and frequency of the applied current in accordance with the current deviation of the first electric motor 122*aa*. The drive circuitry 136*b* controls the current applied to the second electric motor 123*aa* so as to change the current value and frequency of the applied current in accordance with the current deviation of the second electric motor 123*aa*.

The abnormality detecting unit 139*a* functions in the dual mode. The abnormality detecting unit 139*a* detects abnormalities of the servomotors 122*a* and 123*a*. The abnormality detecting unit 139*a* detects abnormalities of the first electric motor 122*aa*, the first rotation sensor 122*ab*, the second electric motor 123*aa*, and the second rotation sensor 123*ab*. The abnormality detecting unit 139*a* receives the detection signals output from the rotation sensors 122*ab* and 123*ab*. Based on the presence or absence of the abnormality of the detection signals, the abnormality detecting unit 139*a* determines the presence or absence of the abnormality of each of the rotation sensor 122*ab* and the rotation sensor 123*ab*. For example, the abnormality detecting unit 139*a* may determine the presence or absence of the abnormality based on: a change of a time interval of reception of the detection signal; nondetection of the detection signal; changes of maximum and minimum values indicated by the detection signals; behavior, such as a waveform, of the detection signals; and the like.

The abnormality detecting unit 139*a* acquires the current command values as the target values output to the electric motors 122*aa* and 123*aa* and the output values of the currents applied to the electric motors 122*aa* and 123*aa*. For example, the abnormality detecting unit 139*a* receives the current command values from the subtracting units 131*c* and 131*d* and receives the output values of the applied currents from the drive circuitry 136*a* and the drive circuitry 136*b*. The abnormality detecting unit 139*a* determines the presence or absence of the abnormality of each of the electric motors 122*aa* and 123*aa* based on the difference between the current command value and the applied current. For example, this difference may be a difference between a change in the current command value with time and a change in the applied current with time.

For example, in a first case in which both of the current value applied to the electric motor 122*aa* and the current value applied to the electric motor 123*aa* are respectively larger than the target current value of the current command value of the electric motor 122*aa* and the target current value of the current command value of the electric motor 123*aa*, the abnormality detecting unit 139*a* determines that the first electric motor 122*aa* is abnormal. An abnormality determination criterion in the first case may be set arbitrarily. For example, the determination criterion may be continuation of the first case for a predetermined period of time or more, instantaneous occurrence of the first case, the frequency of occurrence of the first case within a predetermined period of time, a duration time of the first case within a predetermined period of time, or a combination thereof.

In a second case in which both of the current value applied to the electric motor 122*aa* and the current value applied to the electric motor 123*aa* are respectively smaller than the target current value of the electric motor 122*aa* and the target current value of the electric motor 123*aa*, the abnormality detecting unit 139*a* determines that the first electric motor 122*aa* is abnormal. The abnormality determination criterion in the second case may be set arbitrarily. For example, the abnormality determination criterion in the second case may be similar to that in the first case.

In a third case in which the current value applied to the first electric motor 122*aa* is larger than the target current value of the first electric motor 122*aa*, and the current value applied to the second electric motor 123*aa* is smaller than the target current value of the second electric motor 123*aa*, the abnormality detecting unit 139*a* determines that the second electric motor 123*aa* is abnormal. The abnormality determination criterion in the third case may be set arbitrarily. For example, the abnormality determination criterion in the third case may be similar to one or more of those in the first case and the second case.

In a fourth case in which the current value applied to the first electric motor 122*aa* is smaller than the target current value of the first electric motor 122*aa*, and the current value applied to the second electric motor 123*aa* is larger than the target current value of the second electric motor 123*aa*, the abnormality detecting unit 139*a* determines that the second electric motor 123*aa* is abnormal. The abnormality determination criterion in the fourth case may be set arbitrarily. For example, the abnormality determination criterion in the fourth case may be similar to one or more of those in the first to third cases.

In the present embodiment, the abnormality detecting unit 139a does not compare the instantaneous applied current value and the target current value but compares a waveform representing the behavior of the applied current value with time and a waveform representing the behavior of the target current value with time, However, the present embodiment is not limited to this. For example, the abnormality detecting unit 139a compares the waveform indicated by the applied current values and the waveform indicated by the target current values during a process of at least one operation, such as one operation in which the rails 103A and 103B move from a certain point to another point.

Figure 5A:
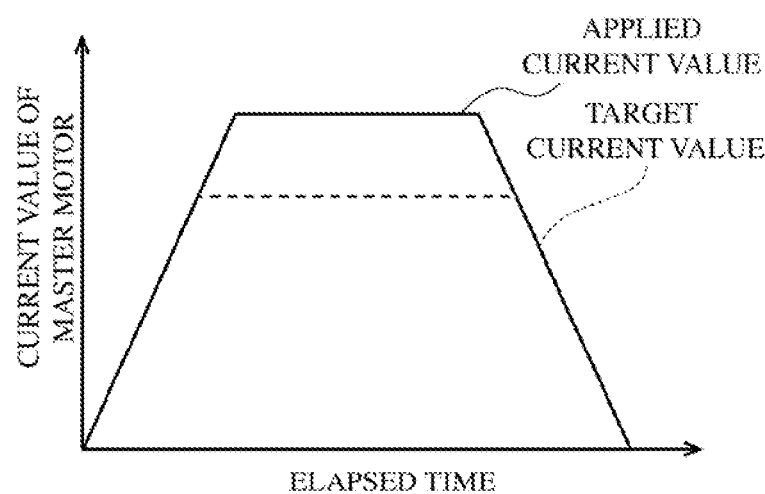
FIG. 5A is a diagram showing one example of behavior of a current value of a master motor in a first case where the drive controller determines that the master motor is abnormal.
Figure 5B:
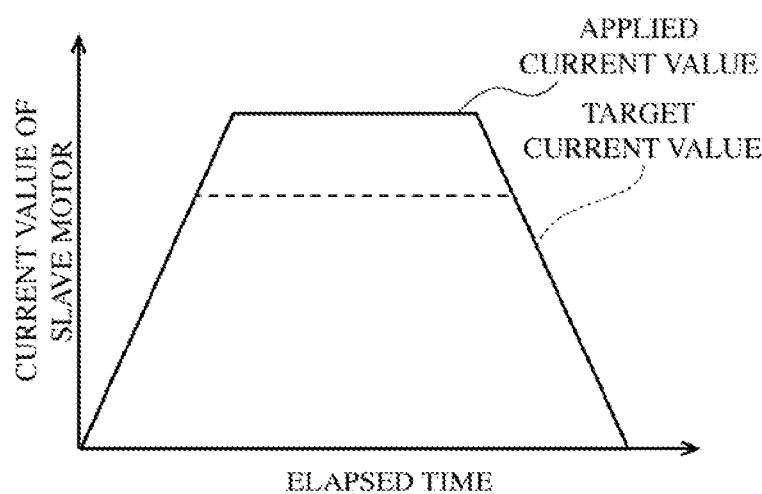
FIG. 5B is a diagram showing one example of behavior of a current value of a slave motor in the first case where the drive controller determines that the master motor is abnormal.

FIG. 5A is a diagram showing one example of the behavior of the current value of the first electric motor 122aa as the master motor in the first case. FIG. 5B is a diagram showing one example of the behavior of the current value of the second electric motor 123aa as the slave motor in the first case. In FIGS. 5A, 5B, 6A, 6B, 7A, 7B, 8A, and 8B, the waveform indicated by the applied current value with time is shown by a solid line, and the waveform indicated by the target current value with time is shown by a broken line. As shown in FIG. 5A, when the first electric motor 122aa has an abnormality in which the applied current value is larger than the target current value, to compensate the difference of the rotational speed, the current control unit 134 generates the corrected current command value obtained by correcting, i.e., increasing the target current value of the second electric motor 123aa. Therefore, as shown in FIG. 5B, the current values applied to the second electric motor 123aa indicate a waveform in which the current values applied to the second electric motor 123aa is larger than the target current values thereof. As above, when both of the waveform of the current value applied to the electric motor 122aa and the waveform of the current value applied to the electric motor 123aa are respectively larger than the waveform of the target current value of the electric motor 122aa and the waveform of the target current value of the electric motor 123aa, the abnormality detecting unit 139a can determine that the first electric motor 122aa is abnormal.

Figure 6A:
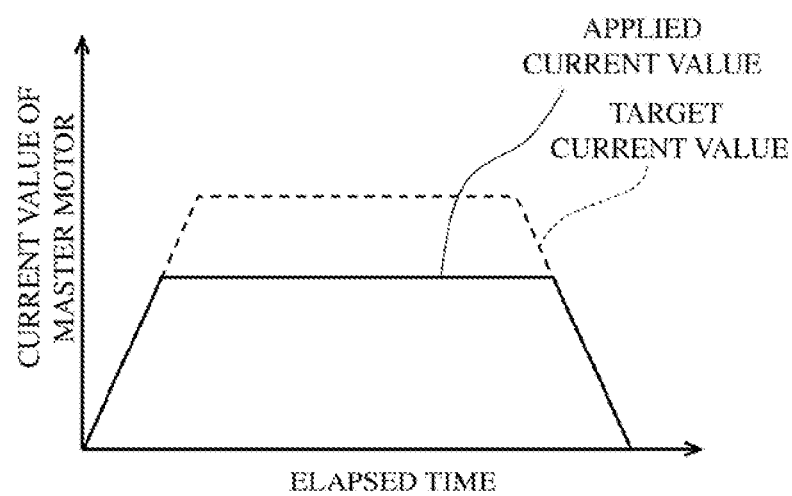
FIG. 6A is a diagram showing one example of behavior of a current value of the master motor in a second case where the drive controller determines that the master motor is abnormal.
Figure 6B:
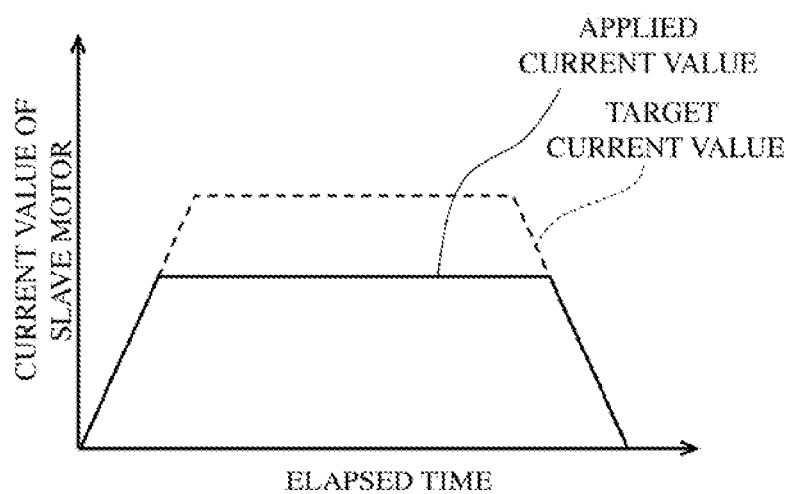
FIG. 6B is a diagram showing one example of behavior of a current value of the slave motor in the second case where the drive controller determines that the master motor is abnormal.

FIG. 6A is a diagram showing one example of the behavior of the current value of the first electric motor 122aa as the master motor in the second case. FIG. 6B is a diagram showing one example of the behavior of the current value of the second electric motor 123aa as the slave motor in the second case. As shown in FIG. 6A, when the first electric motor 122aa has an abnormality in which the applied current value is smaller than the target current value, to compensate the difference of the rotational speed, the current control unit 134 generates the corrected current command value obtained by correcting, i.e., reducing the target current value of the second electric motor 123aa. Therefore, as shown in FIG. 6B, the current values applied to the second electric motor 123aa indicate a waveform in which the current values applied to the second electric motor 123aa is smaller than the target current values thereof. As above, when both of the waveform of the current value applied to the electric motor 122aa and the waveform of the current value applied to the electric motor 123aa are respectively smaller than the waveform of the target current value of the electric motor 122aa and the waveform of the target current value of the electric motor 123aa, the abnormality detecting unit 139a can determine that the first electric motor 122aa is abnormal.

Figure 7A:
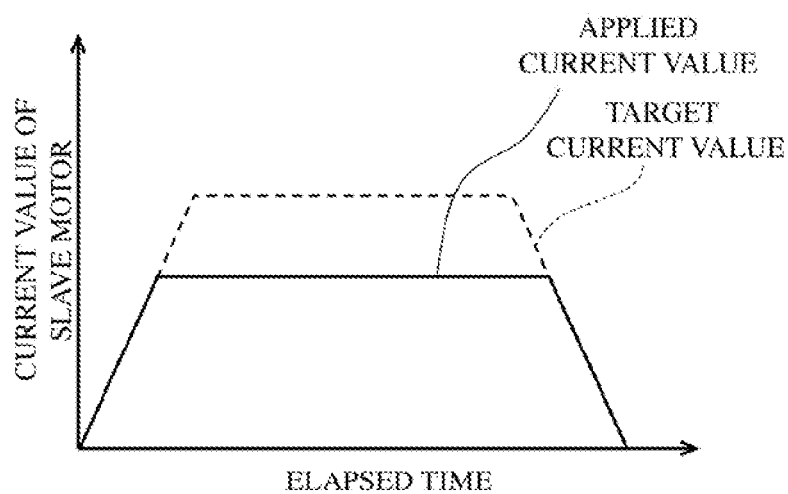
FIG. 7A is a diagram showing one example of behavior of a current value of the slave motor in a third case where the drive controller determines that the slave motor is abnormal.
Figure 7B:
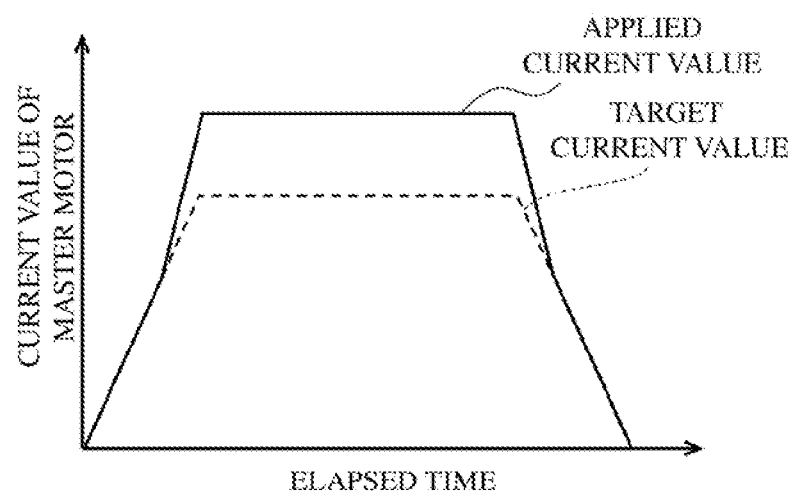
FIG. 7B is a diagram showing one example of behavior of a current value of the master motor in the third case where the drive controller determines that the slave motor is abnormal.

FIG. 7A is a diagram showing one example of the behavior of the current value of the second electric motor 123aa as the slave motor in the third case. FIG. 7B is a diagram showing one example of the behavior of the current value of the first electric motor 122aa as the master motor in the third case. As shown in FIG. 7A, when the second electric motor 123aa has an abnormality in which the applied current value is smaller than the target current value, the rotational torque of the second electric motor 123aa becomes excessively low, and the rotational torque to be output by the first electric motor 122aa increases. With this, as shown in FIG. 7B, the current deviation generated by the subtracting unit 131c increases, and the current values applied to the first electric motor 122aa indicate a waveform in which the current values applied to the first electric motor 122aa is larger than the target current values thereof. As above, when the waveform of the current value applied to the first electric motor 122aa is larger than the waveform of the target current value, and the waveform of the current value applied to the second electric motor 123aa is smaller than the waveform of the target current value, the abnormality detecting unit 139a can determine that the second electric motor 123aa is abnormal.

Figure 8A:
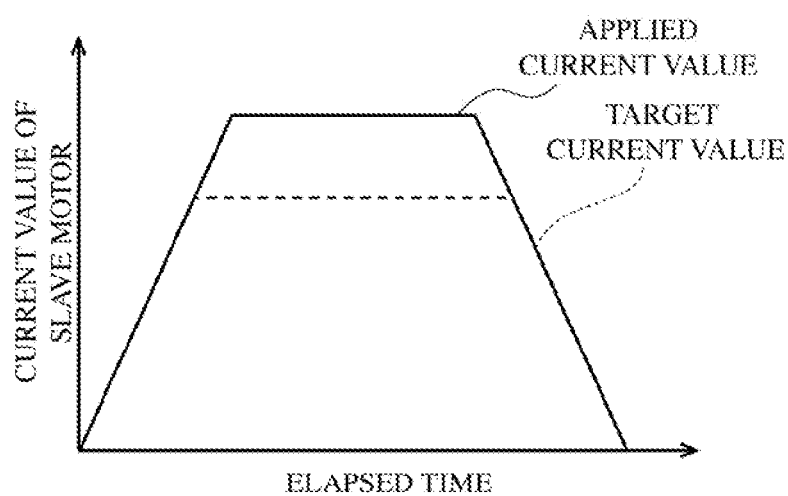
FIG. 8A is a diagram showing one example of behavior of a current value of the slave motor in a fourth case where the drive controller determines that the slave motor is abnormal.
Figure 8B:
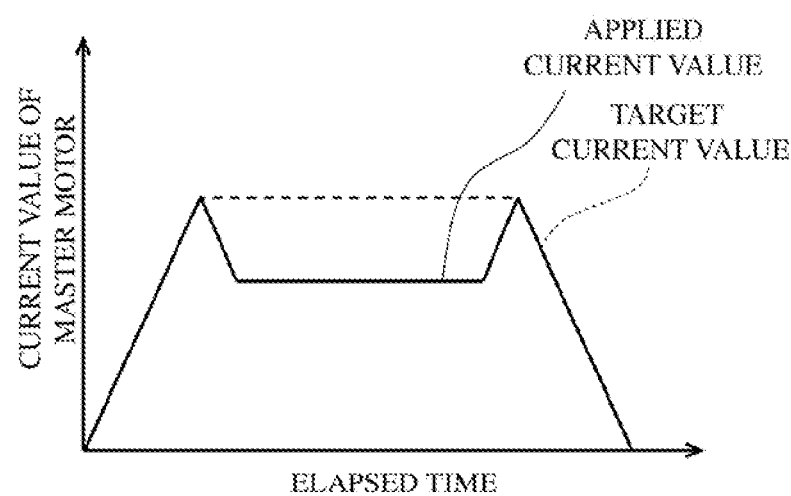
FIG. 8B is a diagram showing one example of behavior of a current value of the master motor in the fourth case where the drive controller determines that the slave motor is abnormal.

FIG. 8A is a diagram showing one example of the behavior of the current value of the second electric motor 123aa as the slave motor in the fourth case. FIG. 8B is a diagram showing one example of the behavior of the current value of the first electric motor 122aa as the master motor in the fourth case. As shown in FIG. 8A, when the second electric motor 123aa has an abnormality in which the applied current value is larger than the target current value, the rotational torque of the second electric motor 123aa becomes excessively large, and the rotational torque to be output by the first electric motor 122aa decreases. With this, as shown in FIG. 8B, the current deviation generated by the subtracting unit 131c decreases, and the current values applied to the first electric motor 122aa indicate a waveform in which the current values applied to the first electric motor 122aa is smaller than the target current values thereof. As above, when the waveform of the current value applied to the first electric motor 122aa is smaller than the waveform of the target current value, and the waveform of the current value applied to the second electric motor 123aa is larger than the waveform of the target current value, the abnormality detecting unit 139a can determine that the second electric motor 123aa is abnormal.

When the abnormality of the servomotor 122a or 123a is detected by the abnormality detecting unit 139a in the dual mode, the mode switching unit 139b switches a control mode to the single mode. When the abnormality of the second electric motor 123aa or the second rotation sensor 123ab is detected, the mode switching unit 139b executes a first single mode in which the master motor is the first servomotor 122a. When the abnormality of the first electric motor 122aa or the first rotation sensor 122ab is detected, the mode switching unit 139b executes a second single mode in which the master motor is the second servomotor 123a. In the present embodiment, the mode switching unit 139b switches a control system in terms of software to switch from the dual mode to the single mode. However, the present embodiment is not limited to this.

For example, in the dual mode, the drive controller 130 operates using a first control system shown in FIG. 4.

Figure 9:
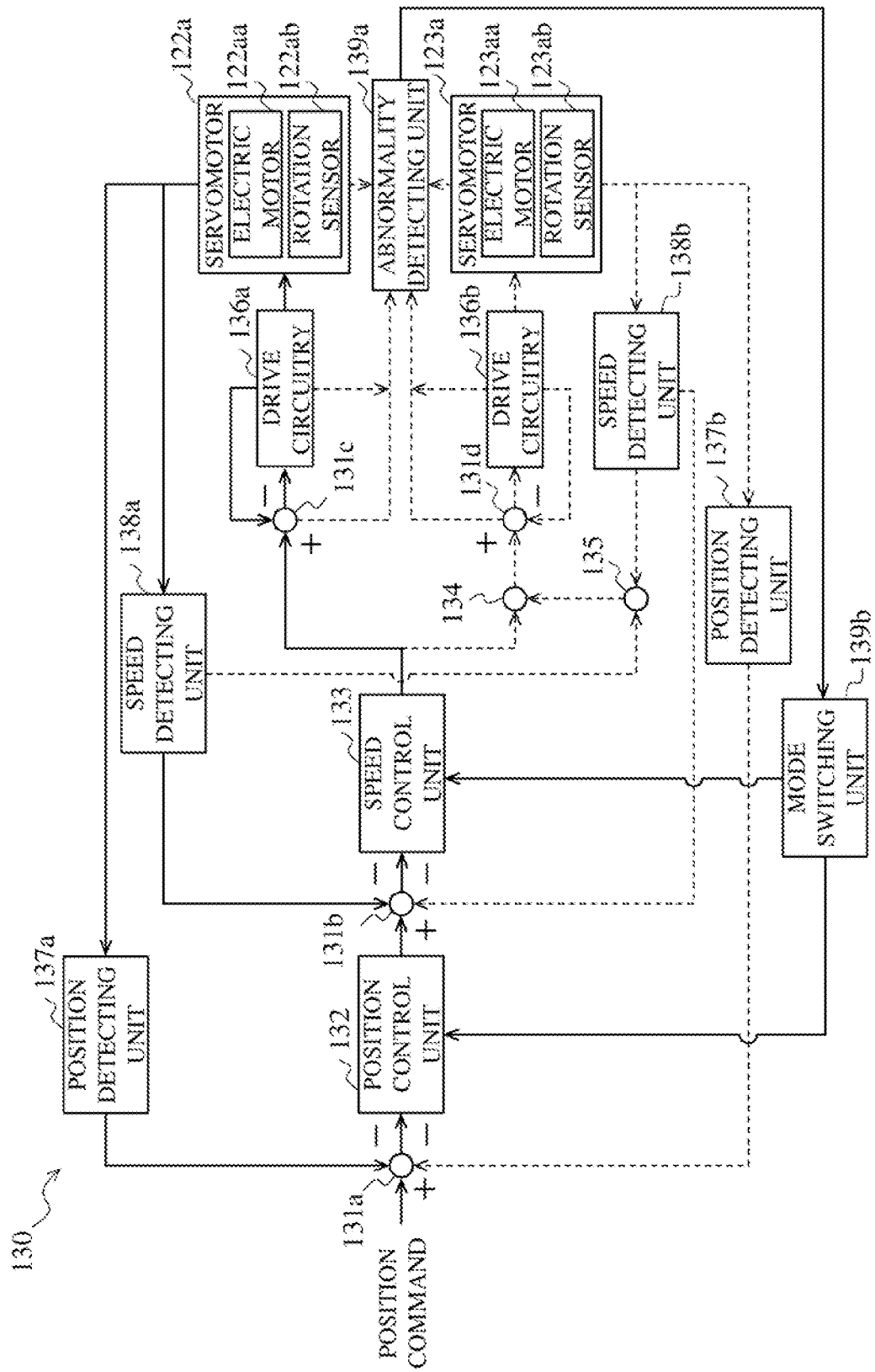
FIG. 9 is a block diagram showing one example of a functional configuration of the drive controller in a first single mode in which a first servomotor is used.

For example, in the first single mode, the drive controller 130 operates using a second control system shown in FIG. 9. FIG. 9 is a block diagram showing one example of a functional configuration of the drive controller 130 in the first single mode in which the first servomotor 122*a* is used. In the second control system, processing related to the second servomotor 123*a* is stopped. In FIG. 9, the flow of the control executed in the second control system is shown by solid-line arrows, and the flow of the control not executed in the second control system is shown by broken-line arrows. In the second control system, the drive controller 130 performs the position control of the first electric motor 122*aa*, i.e., performs the first control.

To suppress excessive load of the first electric motor 122*aa*, the mode switching unit 139*b* outputs to the position control unit 132 and the speed control unit 133 a command of setting one or more among the rotational speed, rotation acceleration, and rotation deceleration of the first electric motor 122*aa* to be lower than corresponding one or more among the rotational speed, the rotation acceleration, and the rotation deceleration during the operation in the dual mode. To be specific, the rotational speed of the first electric motor 122*aa* is set to be low, the rotational torque of the first electric motor 122*aa* is set to be low, or both the rotational speed and rotational torque of the first electric motor 122*aa* are set to be low. For example, the mode switching unit 139*b* may output a command of fixing the output of the first electric motor 122*aa* to constant low output.

For example, the mode switching unit 139*b* may set at least one of upper limits of the target rotational speed, target rotation acceleration, and target rotation deceleration of the first electric motor 122*aa* to be lower than upper limits of the target rotational speed, the target rotation acceleration, and the target rotation deceleration in the dual mode.

Figure 10:
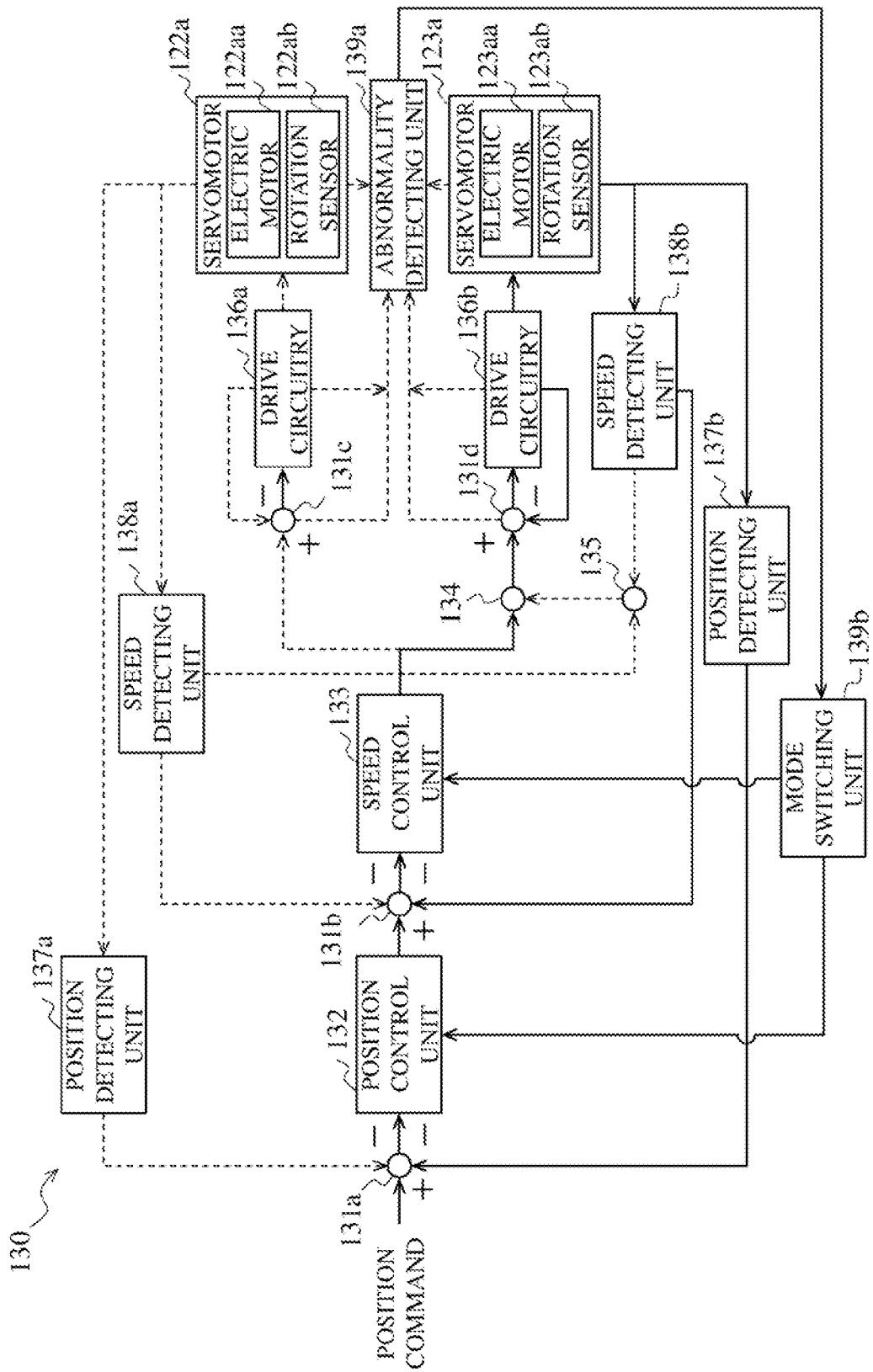
FIG. 10 is a block diagram showing one example of the functional configuration of the drive controller in a second single mode in which a second servomotor is used.

For example, in the second single mode, the drive controller 130 operates using a third control system shown in FIG. 10. FIG. 10 is a block diagram showing one example of a functional configuration of the drive controller 130 in the second single mode in which the second servomotor 123*a* is used. In the third control system, processing related to the first servomotor 122*a* is stopped. In FIG. 10, the flow of the control executed in the third control system is shown by solid-line arrows, and the flow of the control not executed in the third control system is shown by broken-line arrows. In the third control system, the drive controller 130 performs the position control of the second electric motor 123*aa*. This position control is one example of third control. In the third control system, among the components related to the second servomotor 123*a*, the function of the difference detecting unit 135 stops, and the position detector 137*b* functions.

The position detector 137*b* initializes the rotational position of the second electric motor 123*aa* for the position control, i.e., the position detector 137*b* performs zeroing of the rotational position of the second electric motor 123*aa*. The position detector 137*b* may acquire the rotational position of the first electric motor 122*aa* from the position detecting unit 137*a* and initialize the rotational position of the second electric motor 123*aa* based on a relation between the rotational position of the second electric motor 123*aa* which is acquired from the second rotation sensor 123*ab* and the rotational position of the first electric motor 122*aa*. Or, the drive controller 130 may drive the second electric motor 123*aa* such that the rotational position of the first electric motor 122*aa* is set to a reference position, and the position detector 137*b* may perform initialization such that the rotational position of the second electric motor 123*aa* when the rotational position of the first electric motor 122*aa* is the reference position is set as an initial position.

To suppress excessive load of the second electric motor 123*aa*, the mode switching unit 139*b* outputs to the position control unit 132 and the speed control unit 133 a command of setting one or more among the rotational speed, rotation acceleration, and rotation deceleration of the second electric motor 123*aa* to be lower than corresponding one or more among the rotational speed, the rotation acceleration, and the rotation deceleration during the operation in the dual mode. To be specific, the rotational speed of the second electric motor 123*aa* is set to be low, the rotational torque of the second electric motor 123*aa* is set to be low, or both the rotational speed and rotational torque of the second electric motor 123*aa* are set to be low. For example, the mode switching unit 139*b* may output a command of fixing the output of the second electric motor 123*aa* to constant low output.

For example, the mode switching unit 139*b* may set at least one of upper limits of the target rotational speed, target rotation acceleration, and rotation deceleration of the second electric motor 123*aa* to be lower than upper limits of the target rotational speed, target rotation acceleration, and rotation deceleration of the first electric motor 122*aa* in the dual mode. The mode switching unit 139*b* may set at least one of upper limits of the target rotational speed, target rotation acceleration, and rotation deceleration of the second electric motor 123*aa* to be lower than upper limits of the target rotational speed, target rotation acceleration, and rotation deceleration of the second electric motor 123*aa* in the dual mode.

As above, when the servomotor 122*a* or 123*a* is abnormal, the mode switching unit 139*b* stops the abnormal servomotor and continuously drives the electric motor of the normal servomotor in a downgraded state that is lower in specification than the dual mode.

Operation of Drive Controller

Figure 11A:
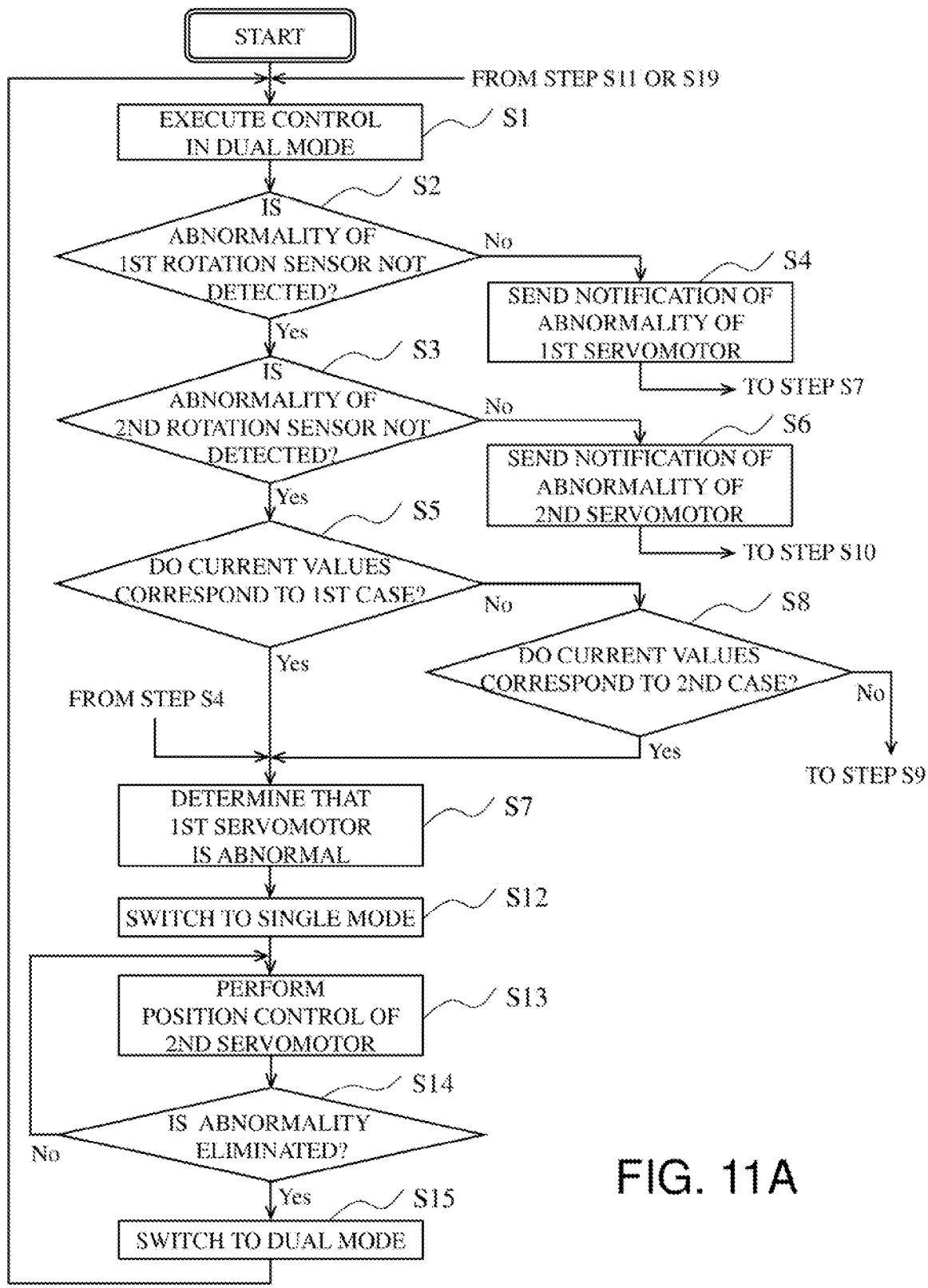
FIG. 11A is a flowchart showing one example of an operation of the drive controller according to the embodiment.
Figure 11B:
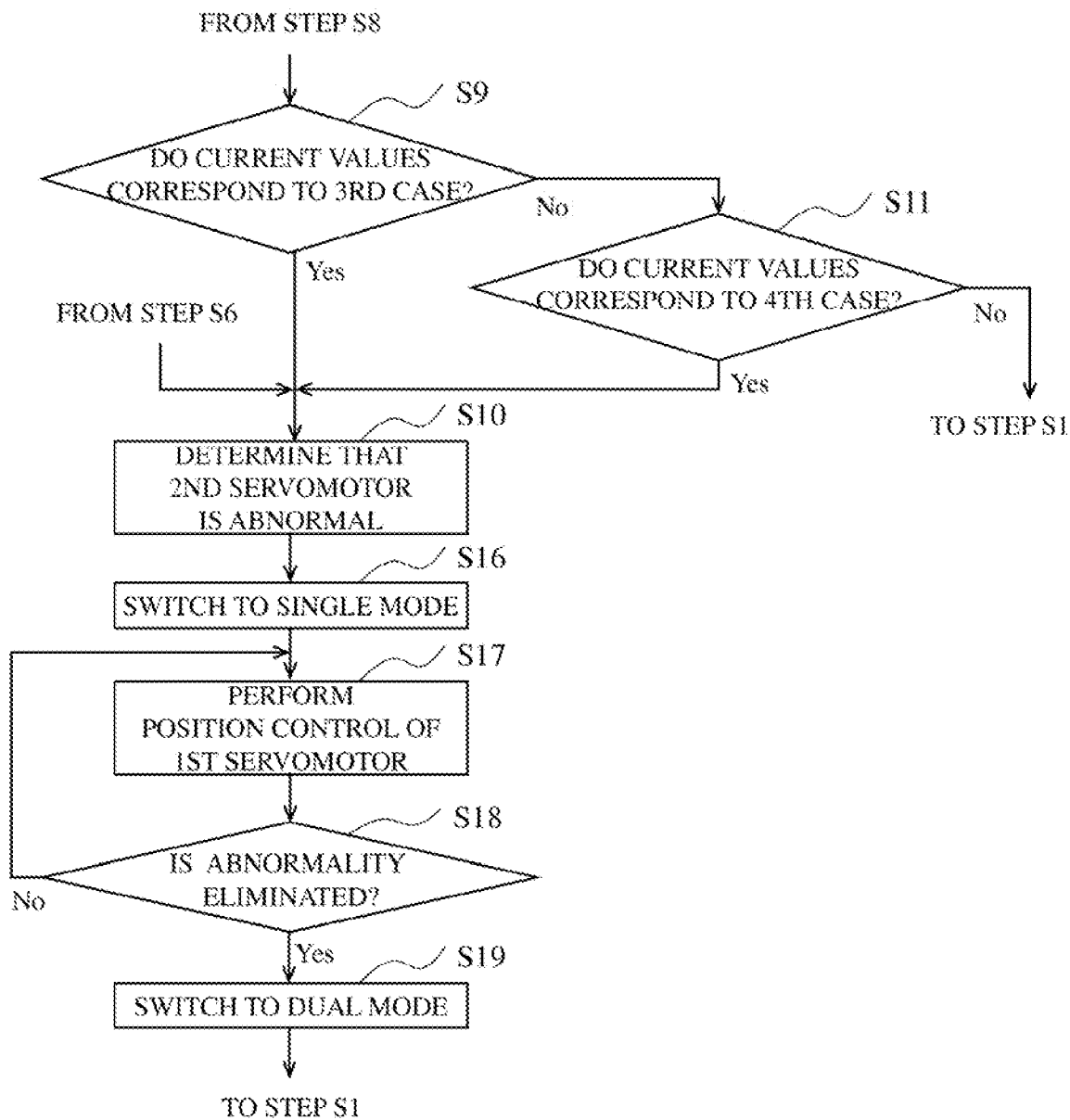
FIG. 11B is a flowchart showing one example of the operation of the drive controller according to the embodiment.

The operation of the drive controller 130 according to the embodiment will be described. Specifically, the operation of the drive controller 130 regarding the detection of the abnormality of the servomotor 122*a* or 123*a* and the switching of the control mode will be described. FIGS. 11A and 11B are flowcharts showing one example of the operation of the drive controller 130 according to the embodiment. As shown in FIGS. 11A and 11B, the drive controller 130 performs the normal operation of the carrier 100 in accordance with a command from the integration controller 300 and controls the servomotors 122*a* and 123*a* in the dual mode (Step S1). The drive controller 130 executes the position control with respect to the first servomotor 122*a* and executes the speed control with respect to the second servomotor 123*a*.

Next, when the abnormality of the first rotation sensor 122*ab* of the first servomotor 122*a* is not detected (Yes in Step S2), the drive controller 130 proceeds to Step S3. When such abnormality is detected (No in Step S2), the drive controller 130 proceeds to Step S4.

In Step S4, the drive controller 130 sends notification of the abnormality of the first rotation sensor 122*ab* to the input-output device 400 and presents the notification to the user by the input-output device 400. Then, the drive controller 130 proceeds to Step S7.

In Step S3, when the abnormality of the second rotation sensor 123*ab* of the second servomotor 123*a* is not detected (Yes in Step S3), the drive controller 130 proceeds to Step S5. When such abnormality is detected (No in Step S3), the drive controller 130 proceeds to Step S6.

In Step S6, the drive controller 130 sends notification of the abnormality of the second rotation sensor 123*ab* to the input-output device 400 and presents the notification to the user by the input-output device 400. Then, the drive controller 130 proceeds to Step S10.

In Step S5, when the current values applied to the servomotors 122a and 123a correspond to the first case (Yes in Step S5), the drive controller 130 proceeds to Step S7. When such current values do not correspond to the first case (No in Step S5), the drive controller 130 proceeds to Step S8.

In Step S8, when the current values applied to the servomotors 122a and 123a correspond to the second case (Yes in Step S8), the drive controller 130 proceeds to Step S7. When such current values do not correspond to the second case (No in Step S8), the drive controller 130 proceeds to Step S9.

In Step S9, when the current values applied to the servomotors 122a and 123a correspond to the third case (Yes in Step S9), the drive controller 130 proceeds to Step S10. When such current values do not correspond to the third case (No in Step S9), the drive controller 130 proceeds to Step S11.

In Step S1, when the current values applied to the servomotors 122a and 123a correspond to the fourth case (Yes in Step S11), the drive controller 130 proceeds to Step S10. When such current values do not correspond to the fourth case (No in Step S11), the drive controller 130 returns to Step S1.

In Step S7, the drive controller 130 determines that the first servomotor 122a is abnormal. Next, the drive controller 130 switches the control mode from the dual mode to the single mode of the second servomotor 123a (Step S12). Next, the drive controller 130 stops the first servomotor 122a and performs the position control of the downgraded state with respect to only the second servomotor 123a in accordance with a command from the integration controller 300 (Step S13).

When the drive controller 130 detects elimination of the abnormality of the first servomotor 122a which may be achieved by repair or the like (Yes in Step S14), the drive controller 130 proceeds to Step S15. When the drive controller 130 does not detect such elimination (No in Step S14), the drive controller 130 returns to Step S13. For example, the drive controller 130 may detect the elimination of the abnormality based on information of the elimination of the abnormality which is input to the input-output device 400 by the user. In Step S15, the drive controller 130 switches the control mode from the single mode of the second servomotor 123a to the dual mode and returns to Step S1.

In Step S10, the drive controller 130 determines that the second servomotor 123a is abnormal. Next, the drive controller 130 switches the control mode from the dual mode to the single mode of the first servomotor 122a (Step S16). Next, the drive controller 130 stops the second servomotor 123a and executes the position control of the downgraded state with respect to only the first servomotor 122a in accordance with a command from the integration controller 300 (Step S17).

When the drive controller 130 detects elimination of the abnormality of the second servomotor 123a (Yes in Step S18), the drive controller 130 proceeds to Step S19. When the drive controller 130 does not detect such elimination (No in Step S18), the drive controller 130 returns to Step S17. In Step S19, the drive controller 130 switches the control mode from the single mode of the first servomotor 122a to the dual mode and returns to Step S1.

The drive controller 130 repeatedly performs Steps S1 to S19 until the drive controller 130 receives a command of stopping the control of the carrier 100.

Modified Example 1

Modified Example 1 of the exemplary embodiment will be described. Modified Example 1 is different from the embodiment in that a drive controller 130A according to Modified Example 1 switches the control mode between the dual mode and the single mode in terms of hardware. Hereinafter, in Modified Example 1, differences from the embodiment will be mainly described, and the same explanation as the embodiment is suitably omitted.

Figure 12:
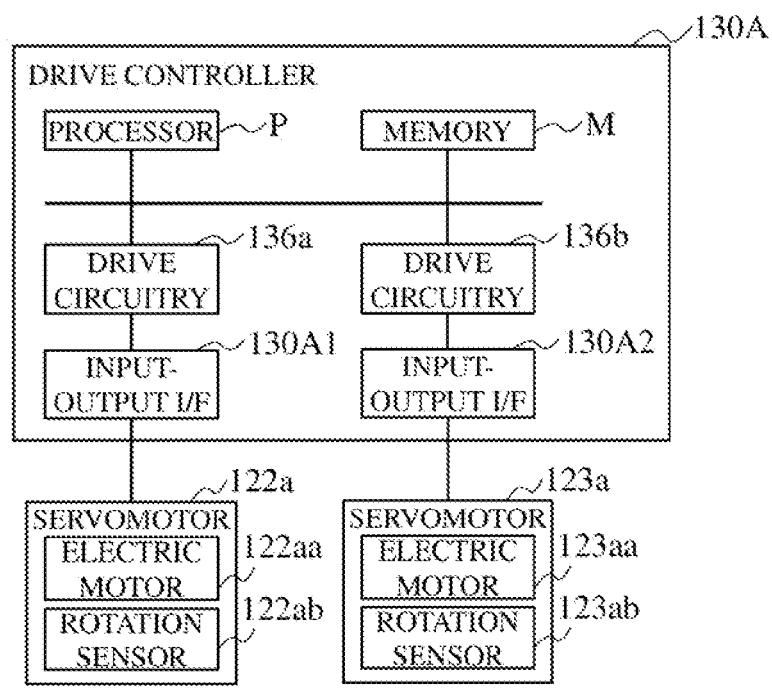
FIG. 12 is a diagram showing one example of a hardware configuration of the drive controller according to Modified Example 1 of the exemplary embodiment.

FIG. 12 is a diagram showing one example of a hardware configuration of the drive controller 130A according to Modified Example 1 of the exemplary embodiment. As shown in FIG. 12, the drive controller 130A includes a first input-output I/F (interface) 130A1 and a second input-output I/F 130A2. The processor P, the memory M, and the drive circuitry 136a and the drive circuitry 136b are electrically connected to each other through a bus, a wire, and the like. The input-output I/Fs 130A1 and 130A2 are electrically connectable to the servomotors 122a and 123a.

The first input-output I/F 130A1 is electrically connected to the drive circuitry 136a. The first input-output I/F 130A1 is an interface to and from which a signal for the position control is input and output. The drive controller 130A performs the position control of the servomotor 122a or 123a electrically connected to the first input-output I/F 130A1.

The second input-output I/F 130A2 is electrically connected to the drive circuitry 136b. The second input-output I/F 130A2 is an interface to and from which a signal for the speed control is input and output. The drive controller 130A performs the speed control of the servomotor 122a or 123a electrically connected to the second input-output I/F 130A2, i.e., performs the second control.

When the input-output I/F 130A 1 is electrically connected to one of the servomotors 122a and 123a, and the input-output I/F 130A2 is electrically connected to the other, the drive controller 130A executes control in the dual mode. When only the first input-output I/F 130A 1 is electrically connected to the first servomotor 122a, the drive controller 130A performs the position control of the first servomotor 122a in the single mode, i.e., performs the first control. When only the first input-output I/F 130A1 is electrically connected to the second servomotor 123a, the drive controller 130A performs the position control of the second servomotor 123a in the single mode, i.e., performs the third control. When only the second input-output I/F 130A2 is electrically connected to either the servomotor 122a or 123a, the drive controller 130A does not execute control.

The input-output I/Fs 130A1 and 130A2 may be configured so as to be electrically connectable to the servomotors 122a and 123a. For example, the input-output I/Fs 130A1 and 130A2 may be connectors or terminals connectable to connectors or terminals of electric cables extending from the servomotors 122a and 123a.

The drive controller 130A according to Modified Example 1 can control each of the servomotors 122a and 123a as the master motor in accordance with the servomotors 122a and 123a electrically connected to the input-output I/Fs 130A1 and 130A2. Moreover, since the control mode can be switched by changing connections of the input-output I/Fs 130A1 and 130A2, the configuration for the switching of the control mode is simple. The positions of the input-output I/Fs 130A1 and 130A2 are not limited to the positions shown in FIG. 12. For example, the input-output I/F 130A1 may be located between the drive circuitry 136a and the computer such as the processor P or the memory M, and the input-output I/F 130A2 may be located between the drive circuitry 136b and the computer such as the processor P or the memory M.

Modified Example 2

Modified Example 2 of the exemplary embodiment will be described. Modified Example 2 is different from Modified Example 1 in that a drive controller 130B according to Modified Example 2 includes a switcher 130B3 that switches electrical connections among input-output I/Fs 130B1 and 130B2 and the servomotors 122a and 123a. Hereinafter, in Modified Example 2, differences from the embodiment and Modified Example 1 will be mainly described, and the same explanation as the embodiment and Modified Example 1 is suitably omitted.

Figure 13:
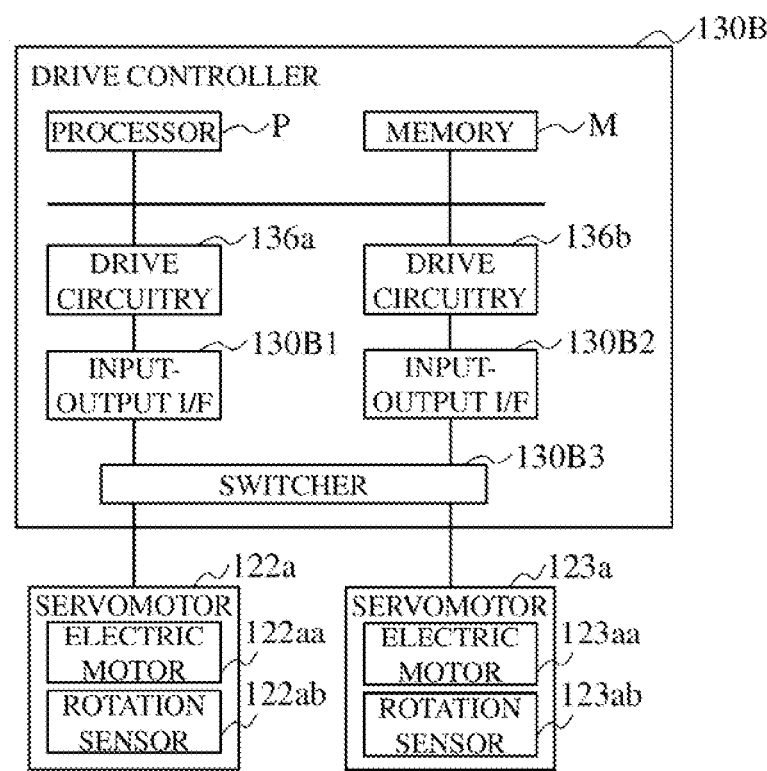
FIG. 13 is a diagram showing one example of the hardware configuration of the drive controller according to Modified Example 2 of the exemplary embodiment.

FIG. 13 is a diagram showing one example of a hardware configuration of the drive controller 130B according to Modified Example 2 of the exemplary embodiment. As shown in FIG. 13, as with the drive controller 130A of Modified Example 1, the drive controller 130B includes the input-output I/Fs 130B1 and 130B2. The drive controller 130B further includes the switcher 130B3 between the input-output I/F 130B1 and the servomotor 122a and between the input-output I/F 130B2 and the servomotor 123a.

The switcher 130B3 is electrically connected to the input-output I/Fs 130B1 and 130B2 and the servomotors 122a and 123a. The switcher 130B3 can switch electrical connections among the first input-output I/F 130B1, the second input-output I/F 130B2, the first servomotor 122a, and the second servomotor 123a. The switcher 130B3 can establish and cut electrical connection of an arbitrary one-to-one combination among the input-output I/Fs 130B1 and 130B2 and the servomotors 122a and 123a.

By the switching of the electrical connection by the switcher 130B3, the drive controller 130B can selectively perform the control of the servomotors 122a and 123a in the dual mode, the control of the first servomotor 122a in the single mode, and the control of the second servomotor 123a in the single mode.

The configuration of the switcher 130B3 may be such a configuration as to be able to change an electrical connection relation among the input-output I/Fs 130B1 and 130B2 and the servomotors 122a and 123a. For example, the switcher 130B3 may be a switch that can be operated by a person or may be a switch that is controlled by the drive controller 130B or the like.

In accordance with the electrical connection established by the switcher 130B3, the drive controller 130B according to Modified Example 2 can perform control in the dual mode in which the servomotor 122a or 123a is the master motor and can perform control in the single mode in which the servomotor 122a or 123a is driven. The configuration of the switcher 130B3 may be such a configuration as to simply establish or cut electrical connections among the input-output I/Fs 130B1 and 130B2 and the servomotors 122a and 123a.

Other Embodiments

The foregoing has described the exemplary embodiment of the present disclosure. However, the present disclosure is not limited to the above embodiment and the above modified examples. To be specific, various modifications and improvements may be made within the scope of the present disclosure. For example, embodiments obtained by variously modifying the embodiment and the modified examples and embodiments obtained by combining components in different embodiments and modified examples are also included in the scope of the present disclosure.

For example, in the embodiment and the modified examples, the driver 150 drives the carrier 100. However, the embodiment and the modified examples are not limited to this. The driver 150 may have a structure where two motors drive one driving shaft together. The configuration of the carrier 100 is not limited to a configuration in which the carrier 100 is used together with the robot 200. The carrier 100 may include the driver 150. The robot 200 is not limited to an industrial robot and may be any robot.

Examples of aspects of the technology of the present disclosure will be described below. A driver according to one aspect of the present disclosure includes: a driving shaft that is rotatable; a first motor located so as to rotate the driving shaft; a second motor located so as to rotate the driving shaft; and a drive controller that controls driving of the first motor and driving of the second motor. The drive controller performs control while switching between a dual mode and a single mode. In the dual mode, the drive controller drives the first motor and the second motor together. In the single mode, the drive controller drives a drive target motor that is one of the first motor and the second motor and performs such control as to set one or more among a rotational speed, rotation acceleration, and rotation deceleration of the drive target motor to be lower than that or those in the dual mode.

According to the above aspect, during the normal operation, the drive controller can perform control in the dual mode. When one of the motors is abnormal, the drive controller can perform control in the single mode. In the single mode, since the drive target motor, in which one or more among the rotational speed, the rotation acceleration, and the rotation deceleration is set to be lower, drives, excessive load acting on the drive target motor is suppressed. Therefore, the driver can continuously operate. For example, even when the driver is used to drive a manufacturing line whose normal driving requires driving of two motors, but one of the motors is abnormal, the driver can continuously drive the manufacturing line in a downgraded state without stopping the manufacturing line.

The driver according to the aspect of the present disclosure may further include: a first rotation sensor that detects a rotation amount of the first motor; and a second rotation sensor that detects a rotation amount of the second motor. In the dual mode, the drive controller may perform first control of controlling a rotational position of the first motor based on a detection result of the first rotation sensor and perform second control of causing the rotational speed of the second motor to synchronize with the rotational speed of the first motor based on the detection result of the first rotation sensor and a detection result of the second rotation sensor.

According to the above aspect, the drive controller precisely controls the driving of the first motor and controls the second motor such that the second motor follows the first motor. Therefore, the control system of the drive controller can be simplified. For example, the drive controller can control the first motor as a master motor and control the second motor as a slave motor of the master motor.

In the driver according to the aspect of the present disclosure, when the drive controller drives the first motor in the single mode, the drive controller may perform the first control with respect to the first motor. When the drive controller drives the second motor in the single mode, the drive controller may perform third control of controlling a rotational position of the second motor based on the detection result of the second rotation sensor. According to the above aspect, in the single mode, the drive controller can precisely control the drive target motor that is the first motor or the second motor.

In the driver according to the aspect of the present disclosure, when the first motor, the second motor, the first rotation sensor, and the second rotation sensor are not abnormal, the drive controller may perform control in the dual mode. When at least either one of the second motor or the second rotation sensor is abnormal, the drive controller may drive the first motor in the single mode. When at least either one of the first motor or the first rotation sensor is abnormal, the drive controller may drive the second motor in the single mode.

According to the above aspect, when a component that is any of the first motor, the second motor, the first rotation sensor, and the second rotation sensor is abnormal, the drive controller drives a motor, which is not related to the abnormal component, in the single mode. The driver can properly operate in the single mode.

In the driver according to the aspect of the present disclosure, the drive controller may detect an abnormality of the first motor and an abnormality of the second motor in the dual mode. When a current value applied to the first motor and a current value applied to the second motor are respectively larger than a target current value of the first motor and a target current value of the second motor or when the current value applied to the first motor and the current value applied to the second motor are respectively smaller than the target current value of the first motor and the target current value of the second motor, the drive controller may determine that the first motor is abnormal. When the current value applied to the first motor is larger than the target current value of the first motor, and the current value applied to the second motor is smaller than the target current value of the second motor, or when the current value applied to the first motor is smaller than the target current value of the first motor, and the current value applied to the second motor is larger than the target current value of the second motor, the drive controller may determine that the second motor is abnormal.

According to the above aspect, the drive controller can detect which is abnormal, the first motor or the second motor. For example, when the current value of the first motor is abnormal, the drive controller controls the current value of the second motor in accordance with the abnormal current value of the first motor, based on a speed difference between the first motor and the second motor. Therefore, when both of the current value of the first motor and the current value of the second motor are larger or smaller than the target current values, the drive controller can determine that the first motor is abnormal. For example, when the current value of the second motor is abnormal, the torque of the second motor is too high or too low. Therefore, to compensate the torque that is too high or too low, the drive controller controls the current value of the first motor and the current value of the second motor. However, the current value of the second motor does not follow the control of the drive controller. Therefore, when one of the current value of the first motor and the current value of the second motor is larger than the target current value, and the other is smaller than the target current value, the drive controller can determine that the second motor is abnormal.

In the driver according to the aspect of the present disclosure, the drive controller may detect an abnormality of the first rotation sensor based on a state of signals received from the first rotation sensor. The drive controller may detect an abnormality of the second rotation sensor based on a state of signals received from the second rotation sensor. According to the above aspect, the drive controller can detect the abnormality of the rotation sensor and perform control in accordance with the detection result.

In the driver according to the aspect of the present disclosure, the drive controller may include: a first input-output interface to and from which signals for the first control and signals for the third control are input and output; and a second input-output interface to and from which signals for the second control are input and output. When the first input-output interface and the second input-output interface are electrically connected to the first motor and the second motor, the drive controller may perform control in the dual mode. When only the first input-output interface is electrically connected to the first motor, the drive controller may perform the first control with respect to the first motor in the single mode. When only the first input-output interface is electrically connected to the second motor, the drive controller may perform the third control with respect to the second motor in the single mode.

According to the above aspect, the mode can be changed by changing electrical connections among the first and second input-output interfaces and the first and second motors. Therefore, the configuration for changing the mode is simplified. For example, changing the above electrical connections may be performed manually by a person.

The driver according to the aspect of the present disclosure may further include a switcher that switches electrical connections among the first input-output interface, the second input-output interface, the first motor, and the second motor.

According to the above aspect, the switcher constitutes hardware that changes electrical connections among the first and second input-output interfaces and the first and second motors. Therefore, switching the mode can be performed by hardware, and the configuration for switching the mode can be simplified. For example, switching of the electrical connection of the switcher may be automatically performed by circuitry or the like or may be manually performed by a person.

In the driver according to the aspect of the present disclosure, the drive controller may switch a control system in each mode by a control program. In the dual mode, the drive controller may execute control using a first control system for the first control and the second control. In the single mode in which the first motor is driven, the drive controller may execute control using a second control system for the first control. In the single mode in which the second motor is driven, the drive controller may execute control using a third control system for the third control. According to the above aspect, switching the mode is realized by software. Hardware for switching is unnecessary, and the simplification of the structure of the driver and the space saving can be realized.

In the driver according to the aspect of the present disclosure, the first motor may be a servomotor including a first electric motor and the first rotation sensor. The second motor may be a servomotor including a second electric motor and the second rotation sensor. The drive controller may servo-control the first electric motor and the second electric motor by using, as feedback information, the detection result of the first rotation sensor, the detection result of the second rotation sensor, a current value applied to the first electric motor, and a current value applied to the second electric motor. According to the above aspect, the drive controller can precisely control the first motor and the second motor. Especially, the drive controller can precisely perform the position control.

A carrier according to one aspect of the present disclosure is a carrier that carries a workpiece handled by a robot. The carrier includes: the driver according to the aspect of the present disclosure; and a moving structure driven by the driver to move the workpiece. According to the above aspect, the same effects as the driver according to the aspect of the present disclosure can be obtained.

The functionality of the elements disclosed herein may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The numerals such as ordinal numbers and quantities as used herein are all given to describe the technology of the present disclosure in concrete terms and not intended to limit the present disclosure. The connection relationships between the elements are used to describe the technology of the present disclosure in concrete terms, and any connection relationships may be employed to achieve the functionality taught in the present disclosure.

Moreover, the division of the blocks in the functional block diagram is one example. Plural blocks may be realized as one block, one block may be divided into plural blocks, some of the functions may be transferred to other blocks, or these may be combined with each other. Furthermore, the functions of plural blocks having similar functions may be processed by single hardware or software in parallel or in time division.

The scope of the present disclosure is defined by the appended claims rather than by the foregoing description so that the present disclosure may be embodied in various forms without departing from the essential characteristics of the present disclosure. The embodiments and modifications are meant to be illustrative only and not limiting as to the scope of the present disclosure. All changes which come within the meaning and range of equivalency of the claims are to be embraced within the scope of the claims.

The invention claimed is:

1. A driver comprising:
a driving shaft that is rotatable;
a first motor located so as to rotate the driving shaft;
a second motor located so as to rotate the driving shaft;
circuitry that is configured to control driving of the first motor and driving of the second motor;
a first rotation sensor that detects a rotation amount of the first motor; and
a second rotation sensor that detects a rotation amount of the second motor; wherein:
the circuitry performs control while switching between a dual mode and a single mode;
in the dual mode, the circuitry drives the first motor and the second motor together;
in the single mode, the circuitry drives a drive target motor that is one of the first motor and the second motor and performs such control as to set one or more among a rotational speed, rotation acceleration, and rotation deceleration of the drive target motor to be lower than that or those in the dual mode,
in the dual mode, the circuitry performs first control of controlling a rotational position of the first motor based on a first detection result of the first rotation sensor and performs second control of causing the rotational speed of the second motor to synchronize with the rotational speed of the first motor based on the first detection result of the first rotation sensor and a second detection result of the second rotation sensor,
when the circuitry drives the first motor in the single mode, the circuitry performs the first control with respect to the first motor;
when the circuitry drives the second motor in the single mode, the circuitry performs third control of controlling a rotational position of the second motor based on the second detection result of the second rotation sensor,
when the circuitry (i) determines, based on the first detection result from the first rotation sensor, that the first motor is not abnormal and (ii) determines, based on the second detection result from the second rotation sensor, that the second motor is not abnormal, the circuitry performs control in the dual mode;
when the circuitry determines, based on the second detection result from the second rotation sensor, that the second motor is abnormal, the circuitry drives the first motor in the single mode; and
when the circuitry determines, based on the first detection result from the first rotation sensor, that the first rotation sensor is abnormal, the circuitry drives the second motor in the single mode.

2. The driver according to claim 1, wherein:
the circuitry is configured to detect an abnormality of the first motor and an abnormality of the second motor in the dual mode;
when a current value applied to the first motor and a current value applied to the second motor are respectively larger than a target current value of the first motor and a target current value of the second motor or when the current value applied to the first motor and the current value applied to the second motor are respectively smaller than the target current value of the first motor and the target current value of the second motor, the circuitry determines that the first motor is abnormal; and
when the current value applied to the first motor is larger than the target current value of the first motor, and the current value applied to the second motor is smaller than the target current value of the second motor, or when the current value applied to the first motor is smaller than the target current value of the first motor, and the current value applied to the second motor is larger than the target current value of the second motor, the circuitry determines that the second motor is abnormal.

3. The driver according to claim 1, wherein:
the circuitry detects an abnormality of the first rotation sensor based on a state of signals received from the first rotation sensor; and the circuitry detects an abnormality of the second rotation sensor based on a state of signals received from the second rotation sensor.

4. The driver according to claim 1, wherein:

the first motor is a servomotor including a first electric motor and the first rotation sensor;

the second motor is a servomotor including a second electric motor and the second rotation sensor; and the circuitry is configured to servo-control the first electric motor and the second electric motor by using, as feedback information, the first detection result of the first rotation sensor, the second detection result of the second rotation sensor, a current value applied to the first electric motor, and a current value applied to the second electric motor.

5. A carrier that carries a workpiece handled by a robot, the carrier comprising:

the driver according to claim 1; and a moving structure driven by the driver to move the workpiece.

* * * * *